(12) United States Patent
Varadarajan et al.

(10) Patent No.: US 7,184,073 B2
(45) Date of Patent: Feb. 27, 2007

(54) SYSTEM AND METHOD FOR WARNING DRIVERS BASED ON ROAD CURVATURE

(75) Inventors: Sridhar Varadarajan, Bangalore (IN); Veena Sudhindra, Bangalore (IN); Korrapati Kalyana Rao, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 819 days.

(21) Appl. No.: 10/411,088

(22) Filed: Apr. 11, 2003

(65) Prior Publication Data

US 2004/0201672 A1  Oct. 14, 2004

(51) Int. Cl.
*H04N 7/18* (2006.01)
(52) U.S. Cl. ...................................... 348/148
(58) Field of Classification Search ............... 348/143, 348/148, 159; 340/425.5, 435, 439, 517, 340/521, 576, 903; 382/104; 701/23–28; 362/466; *H04N 7/18*
See application file for complete search history.

(56) References Cited

U.S. PATENT DOCUMENTS

| | | | | |
|---|---|---|---|---|
| 5,020,620 A | * | 6/1991 | Field ........................... 701/23 |
| 5,642,093 A | * | 6/1997 | Kinoshita et al. ........... 340/439 |
| 5,675,489 A | | 10/1997 | Pomerleau | |
| 5,684,696 A | | 11/1997 | Rao et al. | |
| 6,626,564 B2 | * | 9/2003 | Horii et al. .................. 362/466 |
| 6,807,287 B1 | * | 10/2004 | Hermans ..................... 382/104 |
| 2002/0055808 A1 | * | 5/2002 | Matsumoto .................. 348/148 |

OTHER PUBLICATIONS

Bertozzi et al., "Sensing of Automotive Environments Using Stereo Vision", pp. 1-7, (1997).
Xiong, "White Paper: Automated Road Network Extraction from High Resolutions Images", National Consortium on Remote Sensing in Transportation, Earth Data Analysis Center, University of New Mexico, pp. 1-20, (Mar. 2001).

* cited by examiner

*Primary Examiner*—Richard Lee
(74) *Attorney, Agent, or Firm*—Venable LLP; Catherine M. Voorhees

(57) ABSTRACT

A system for warning a driver based on the road curvature consisting of multiple integrated cameras to acquire the images of different scales simultaneously, a camera controller to configure the cameras based on the vehicle speed and visibility criteria, a processor to analyze the multi-scale images to construct the mosaic, and warning generation subsystem to warn the driver about the safety speed based on the comparison of the mosaic with the curvature templates.

20 Claims, 19 Drawing Sheets

ARCHITECTURE OF ROAD CURVATURE WARNING SYSTEM

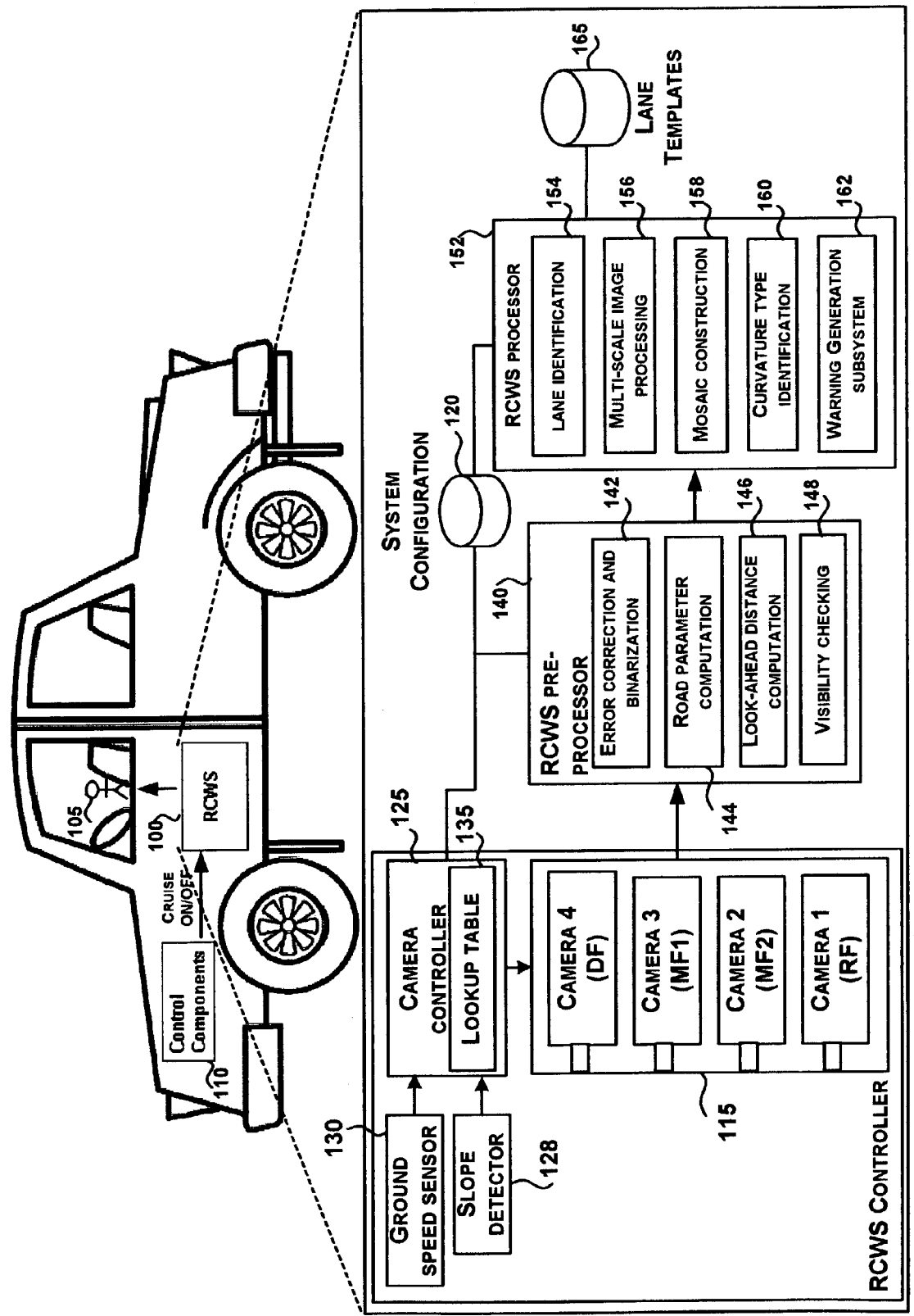
FIG. 1: ARCHITECTURE OF ROAD CURVATURE WARNING SYSTEM

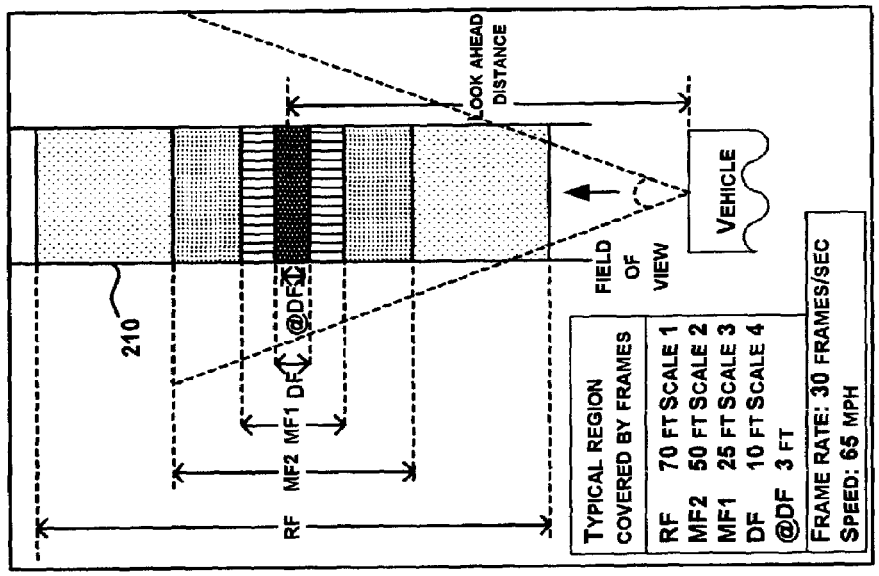
Fig. 2B: Frame Characteristics
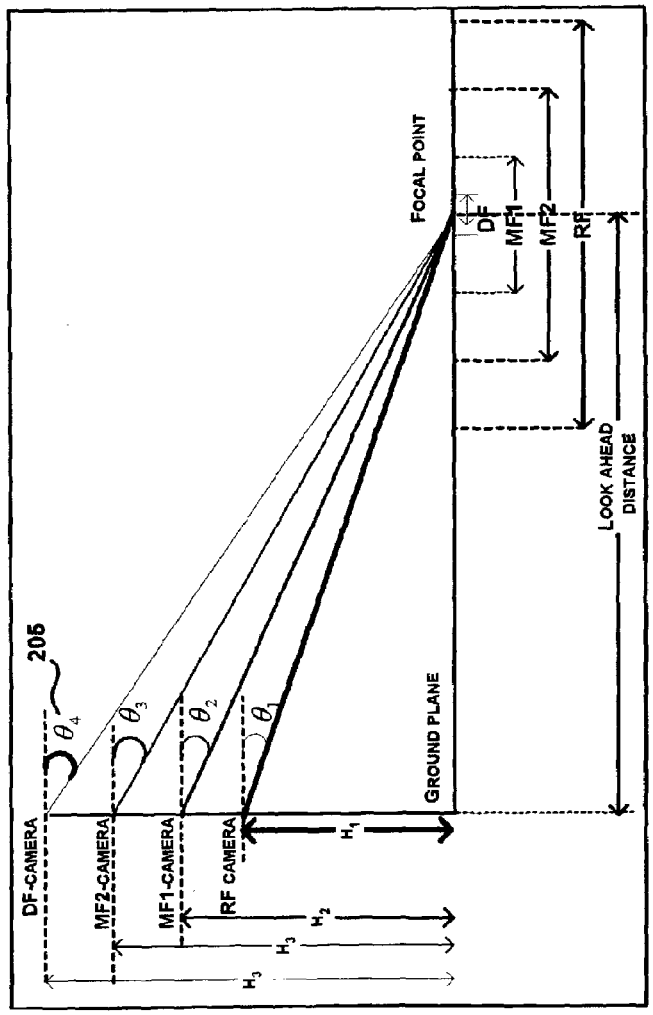
Fig. 2A: Configuration of Multiple Cameras
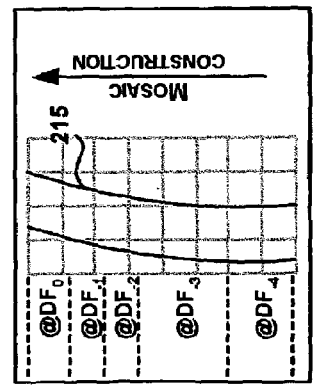
Fig. 2C: Lane Reconstruction

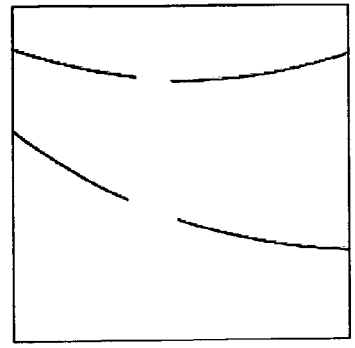
FIG. 3D: ORIGINAL IMAGE (SCALE 4)
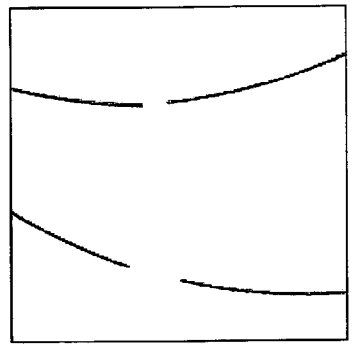
FIG. 3C: ORIGINAL IMAGE (SCALE 3)
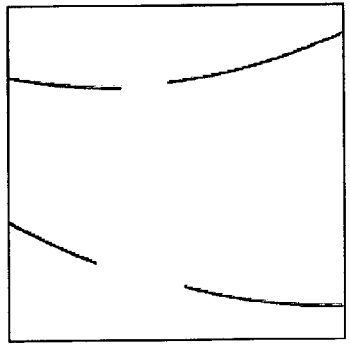
FIG. 3B: ORIGINAL IMAGE (SCALE 2)
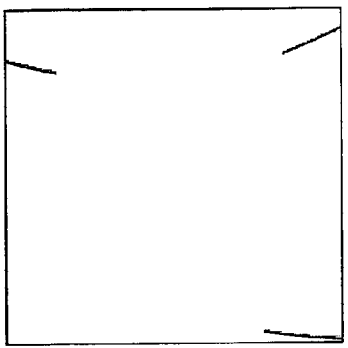
FIG. 3A: ORIGINAL IMAGE (SCALE 1)
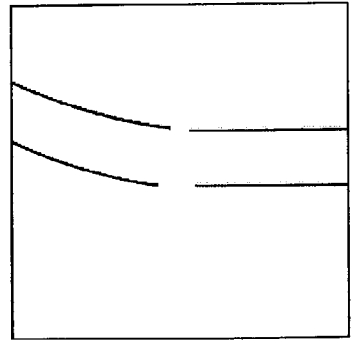
FIG. 3H: IPM IMAGE (SCALE 4)
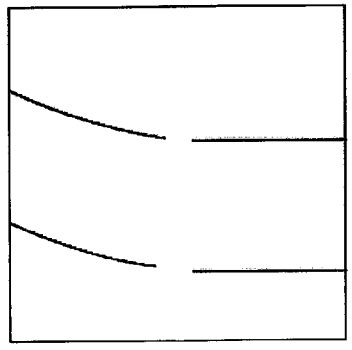
FIG. 3G: IPM IMAGE (SCALE 3)
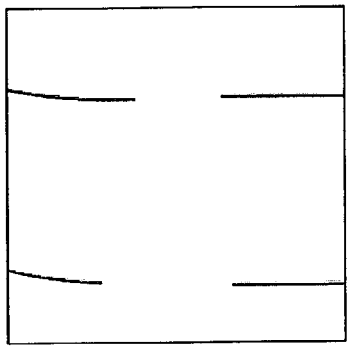
FIG. 3F: IPM IMAGE (SCALE 2)
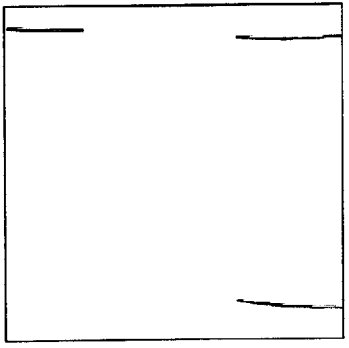
FIG. 3E: IPM IMAGE (SCALE 1)
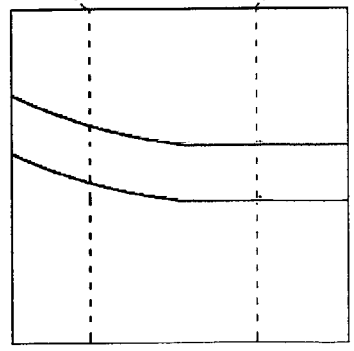
FIG. 3L: CORRECTED IMAGE (SCALE 4)
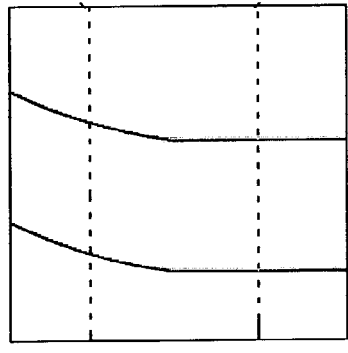
FIG. 3K: CORRECTED IMAGE (SCALE 3)
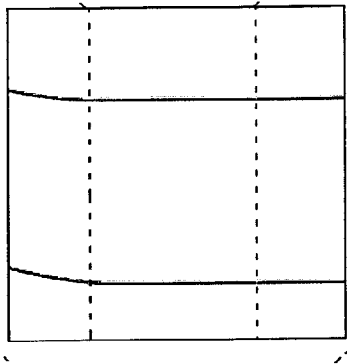
FIG. 3J: CORRECTED IMAGE (SCALE 2)
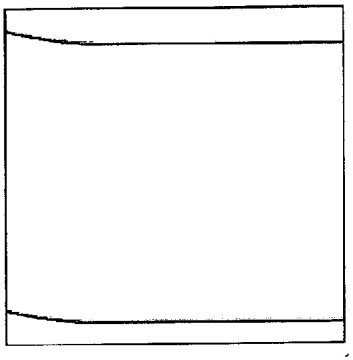
FIG. 3I: CORRECTED IMAGE (SCALE 1)

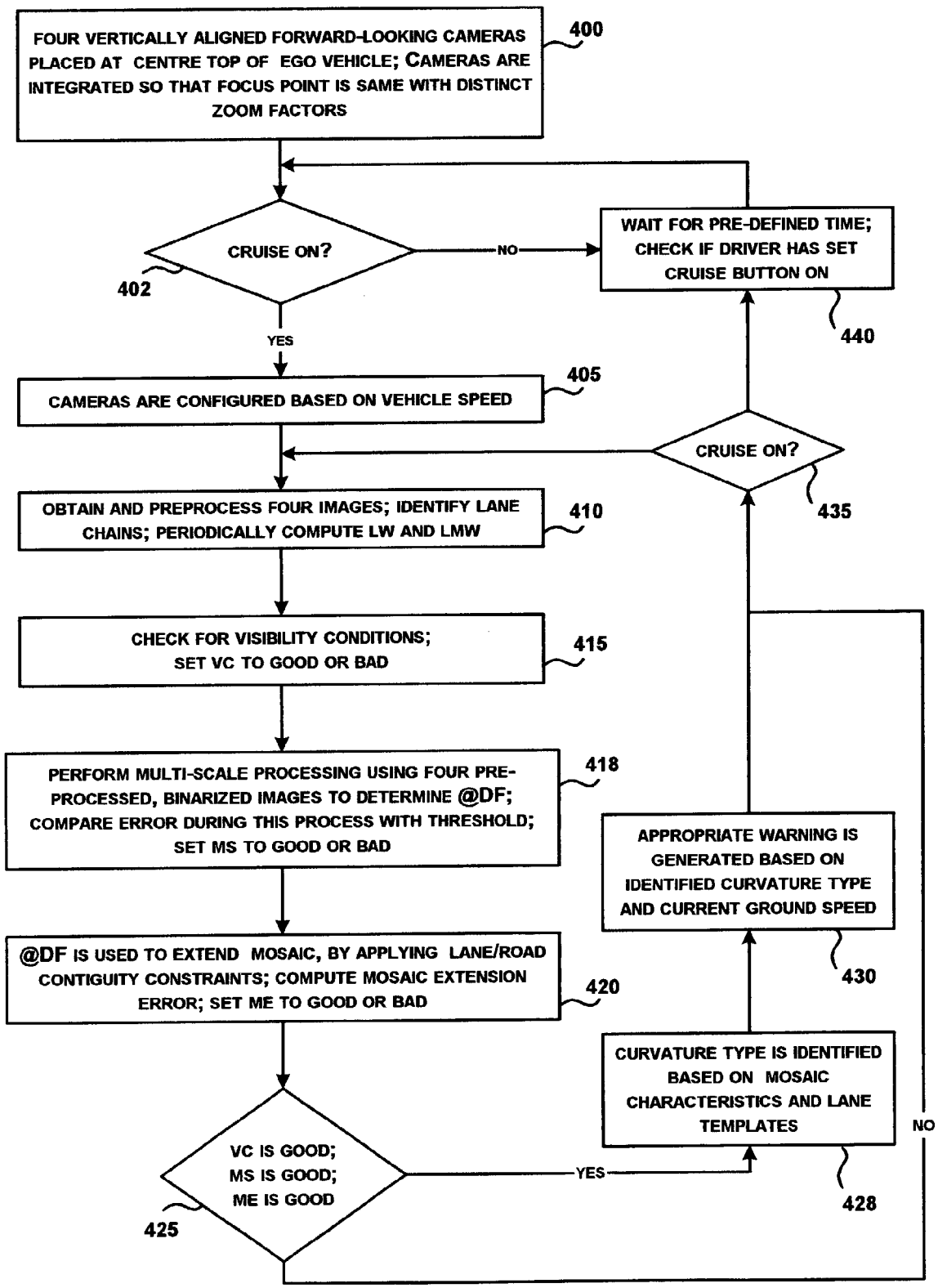
FIG. 4: WORKFLOW OF ROAD CURVATURE WARNING SYSTEM

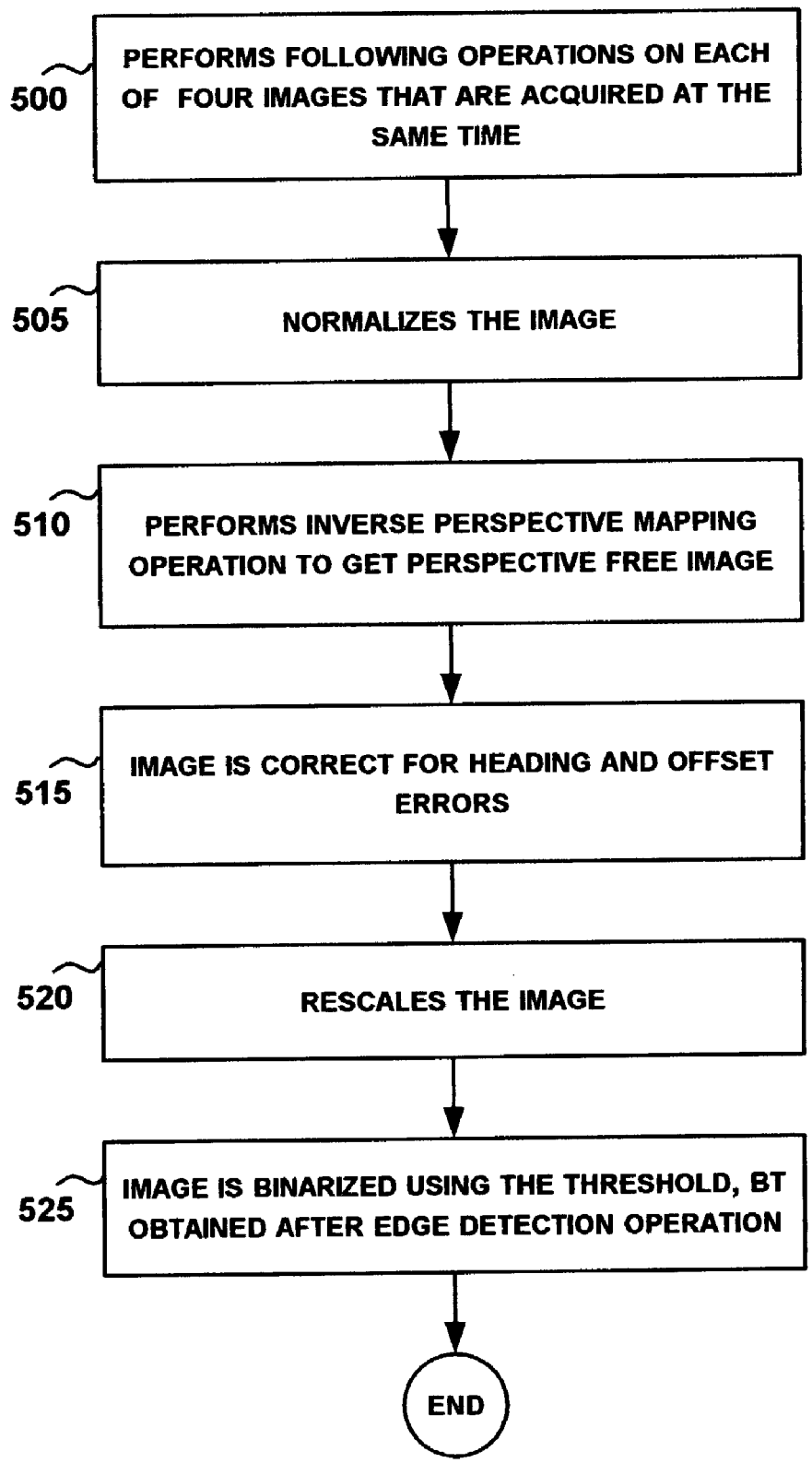
FIG. 5: PRE-PROCESSING OF IMAGES

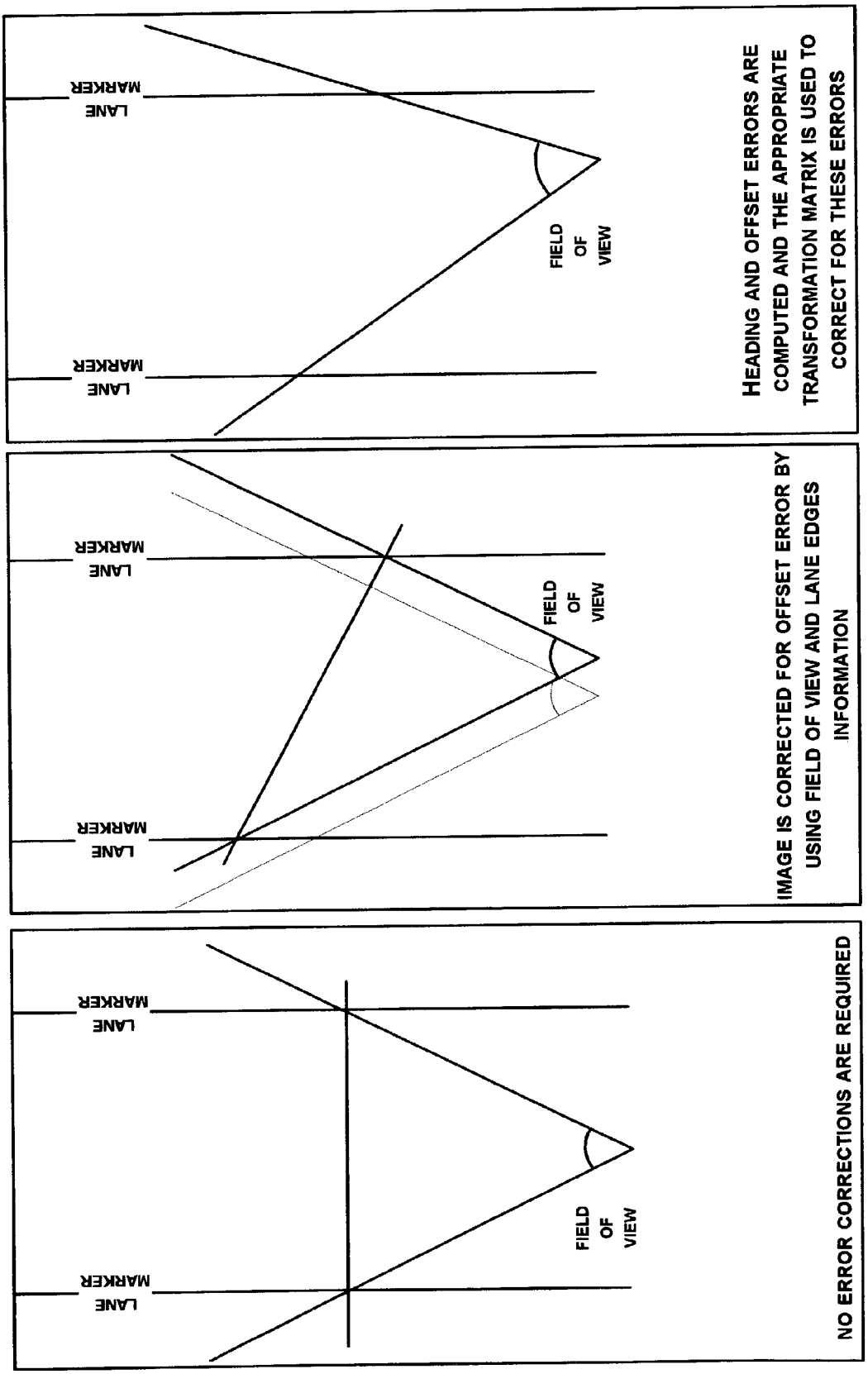

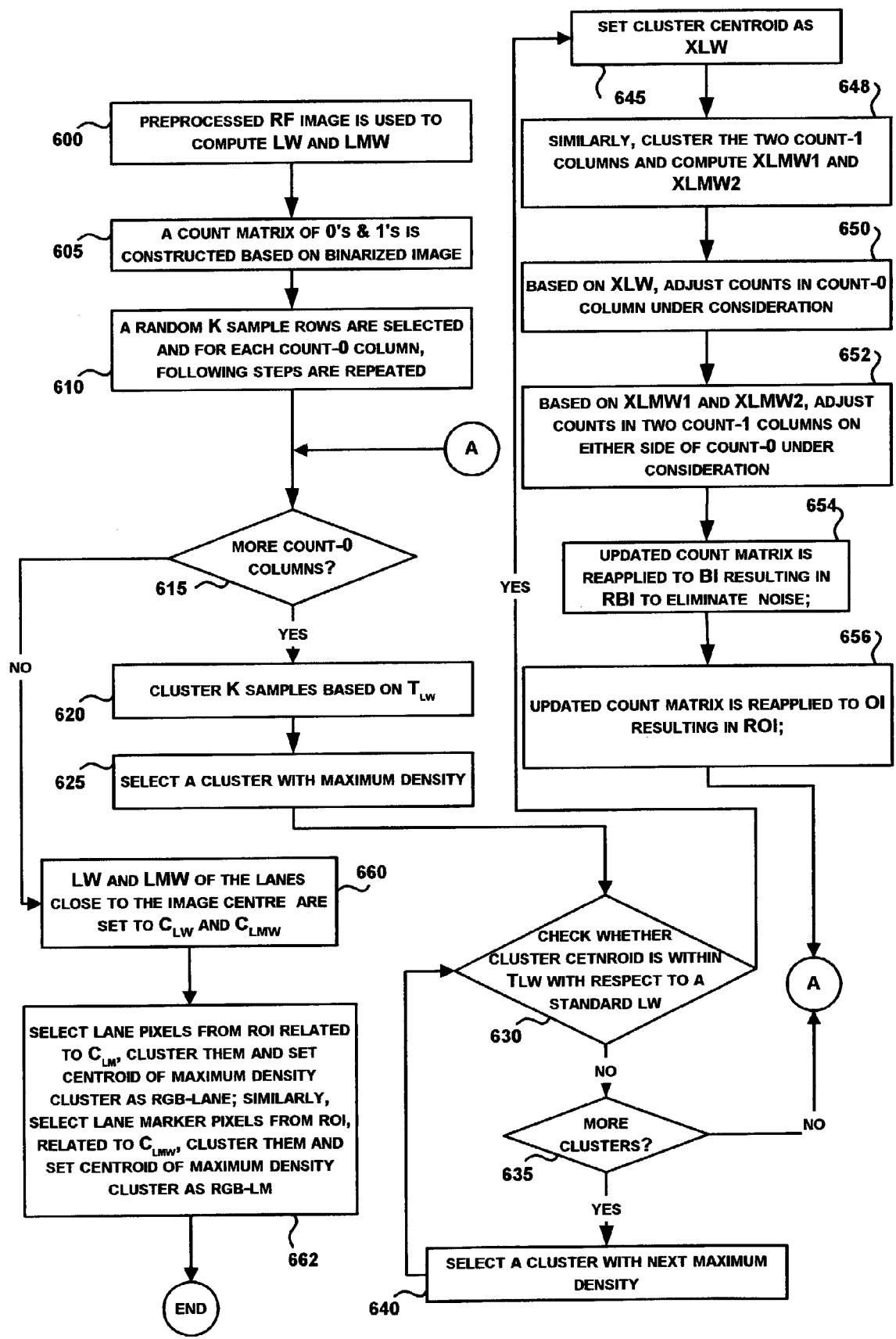
FIG. 6: PERIODIC COMPUTATION OF ROAD PARAMETERS

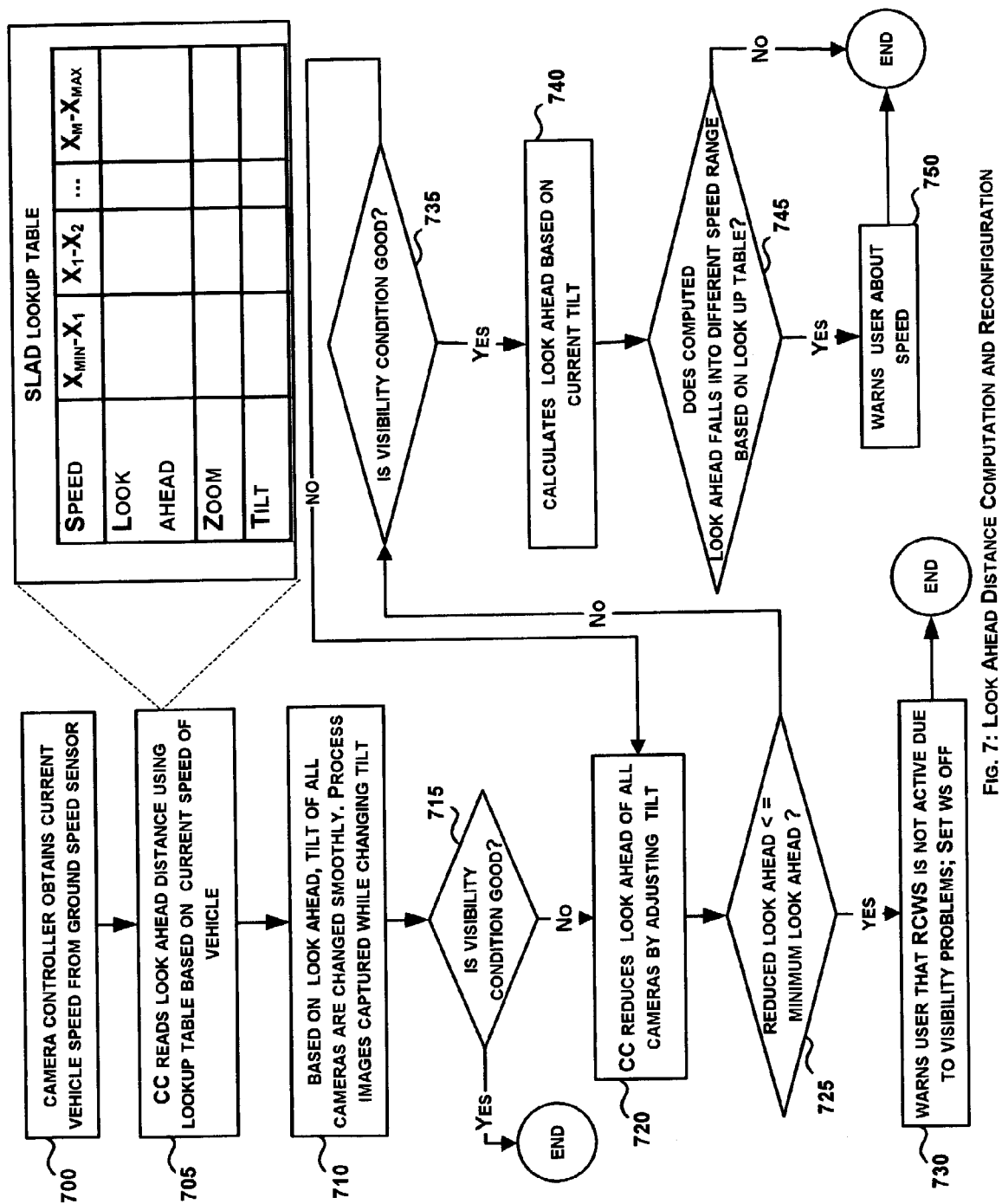
FIG. 7: Look Ahead Distance Computation and Reconfiguration

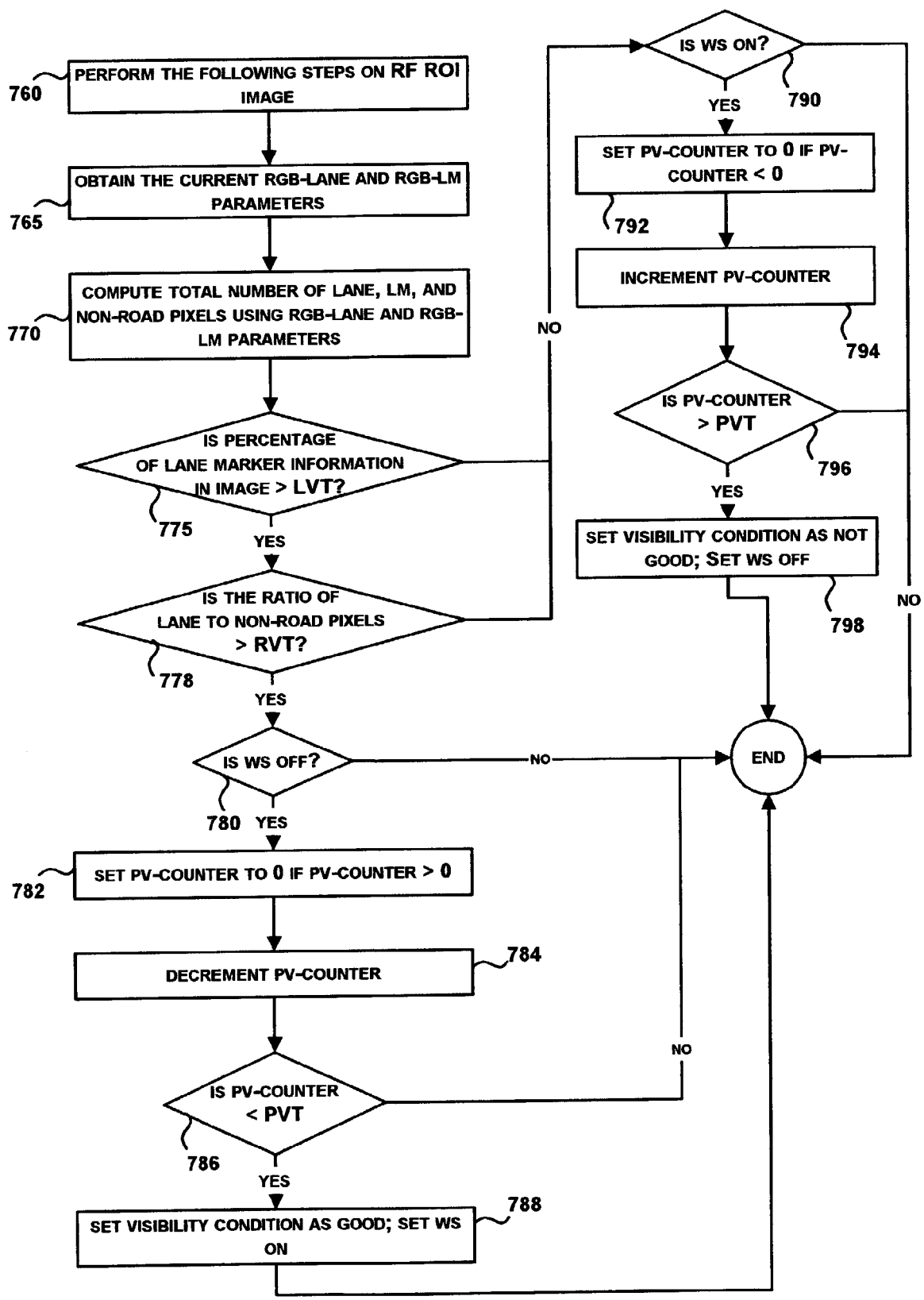
FIG. 7A: VISIBILITY CRITERIA CHECKING

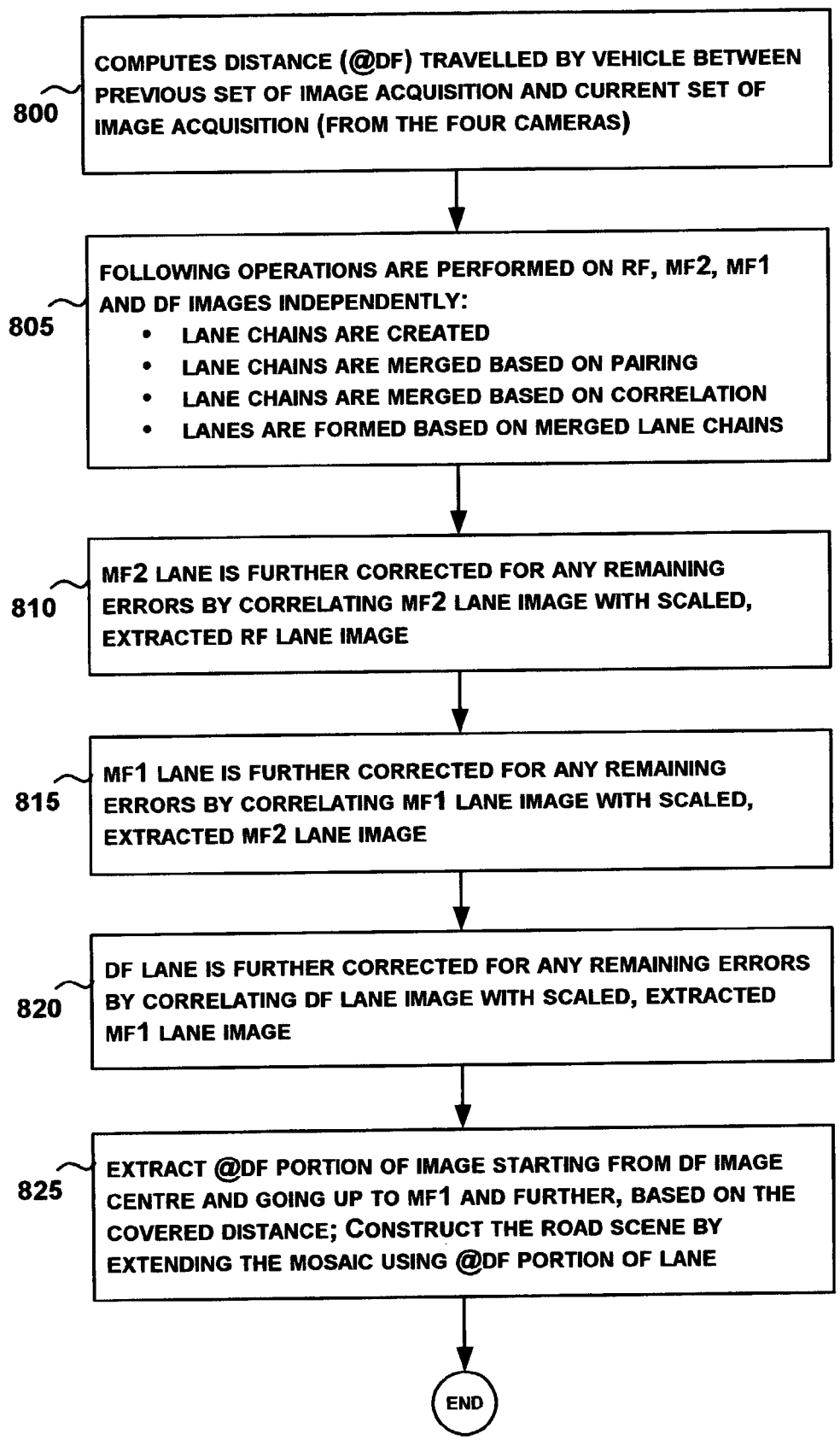
FIG. 8: MULTI-SCALE PROCESSING OF IMAGES

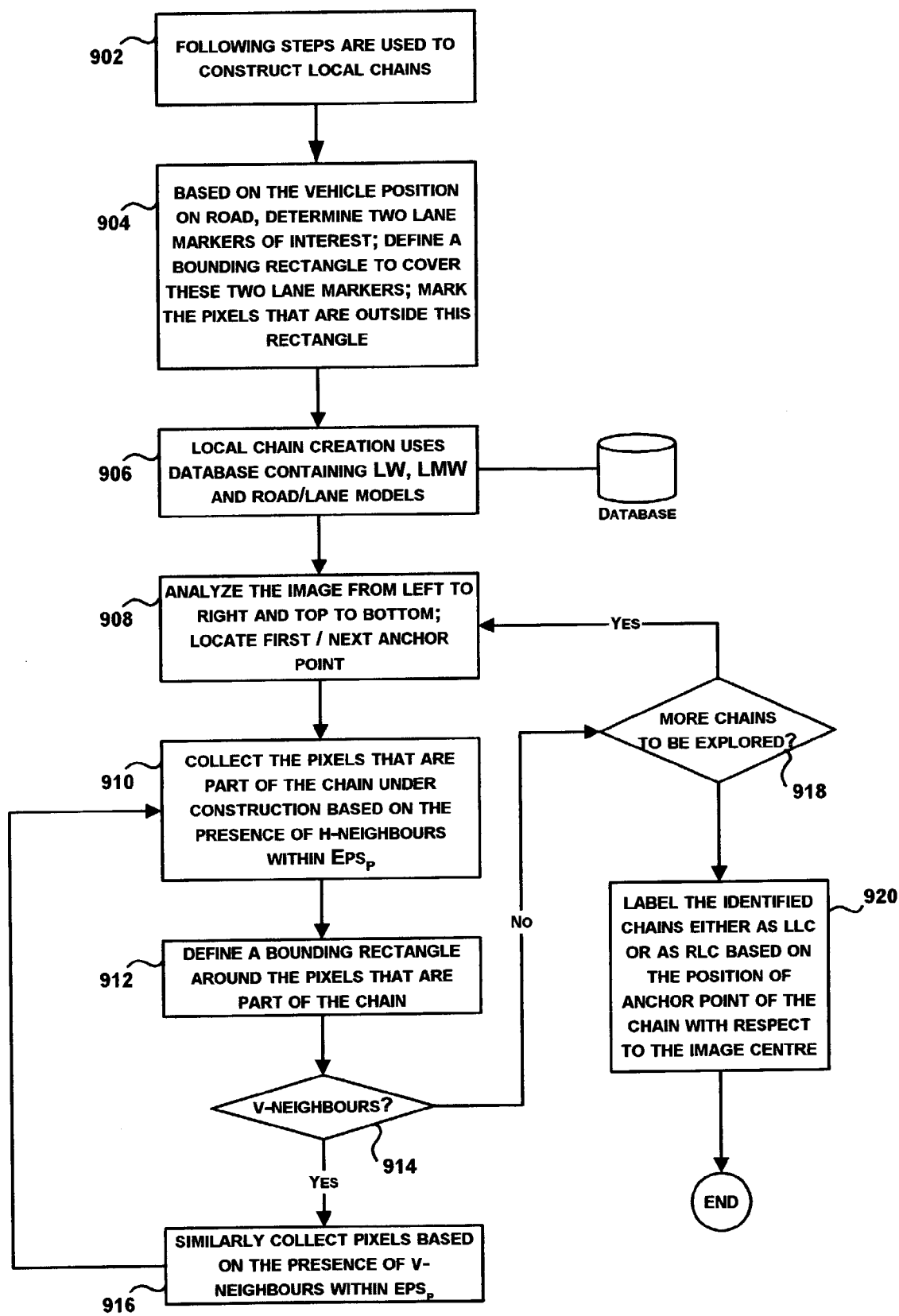
FIG. 9: LANE CHAIN CREATION

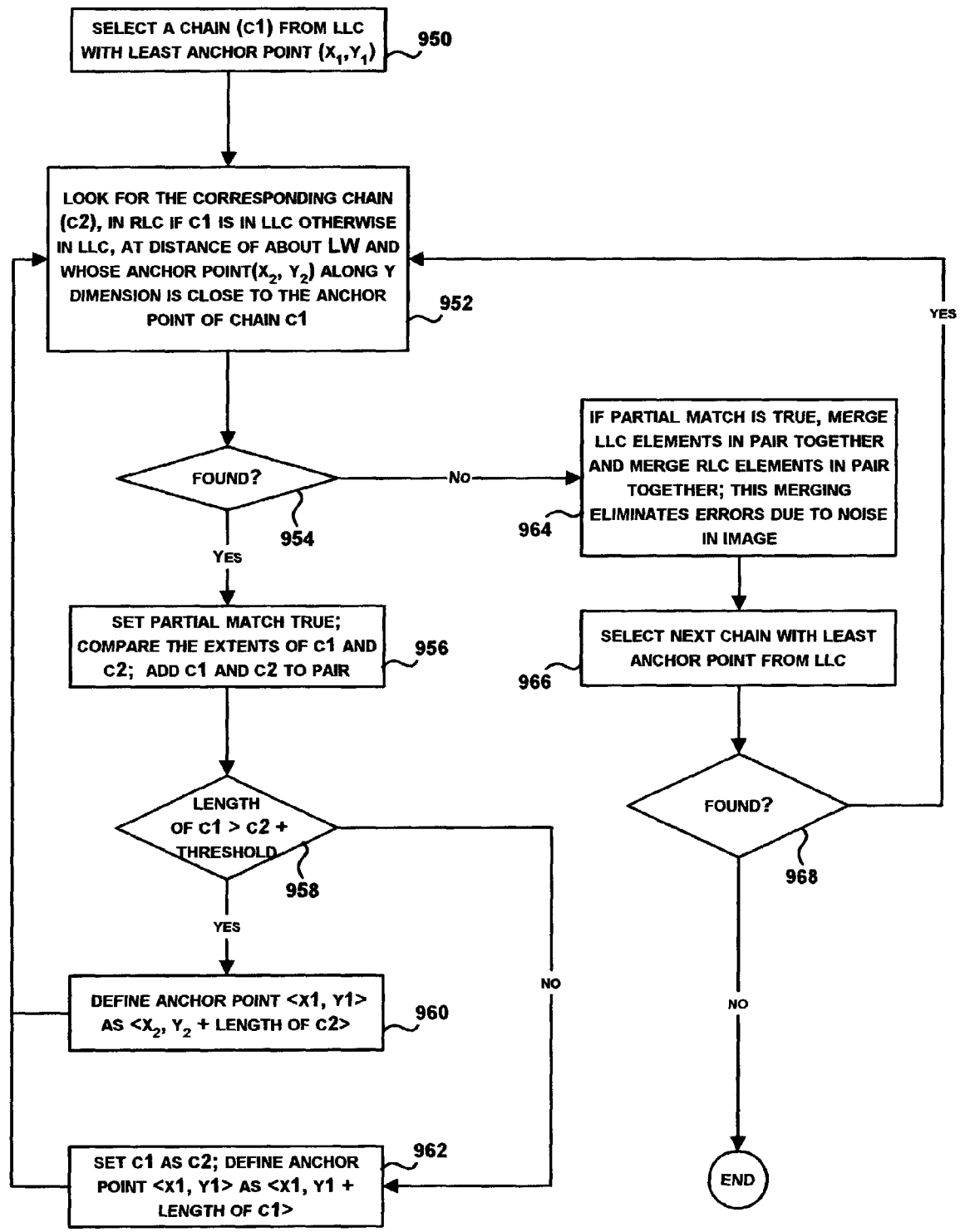
FIG. 9A: VERTICALLANE CHAIN MERGING BASED ON PAIRING

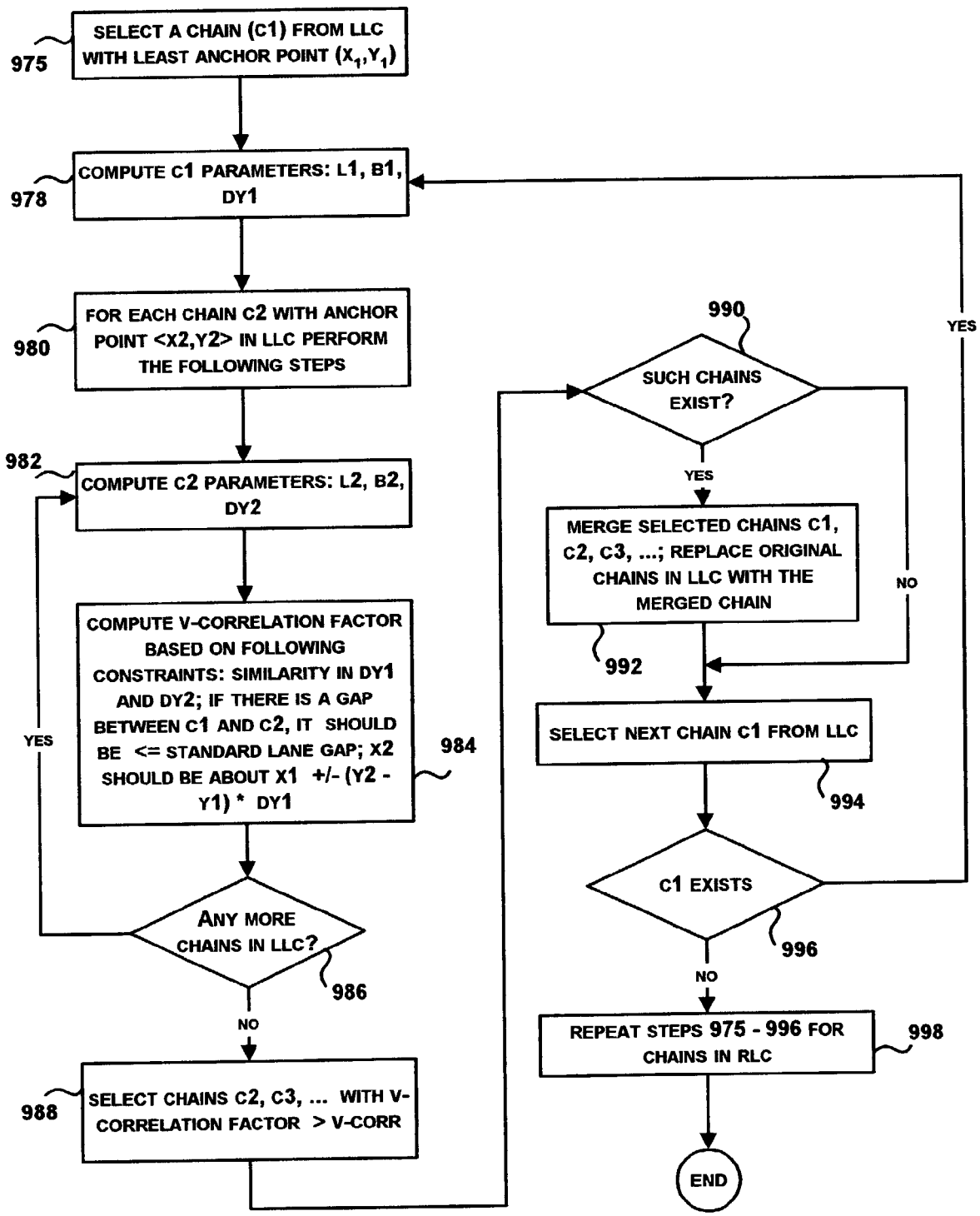
Fig. 9B: Vertical Lane Chain Merging based on Correlation

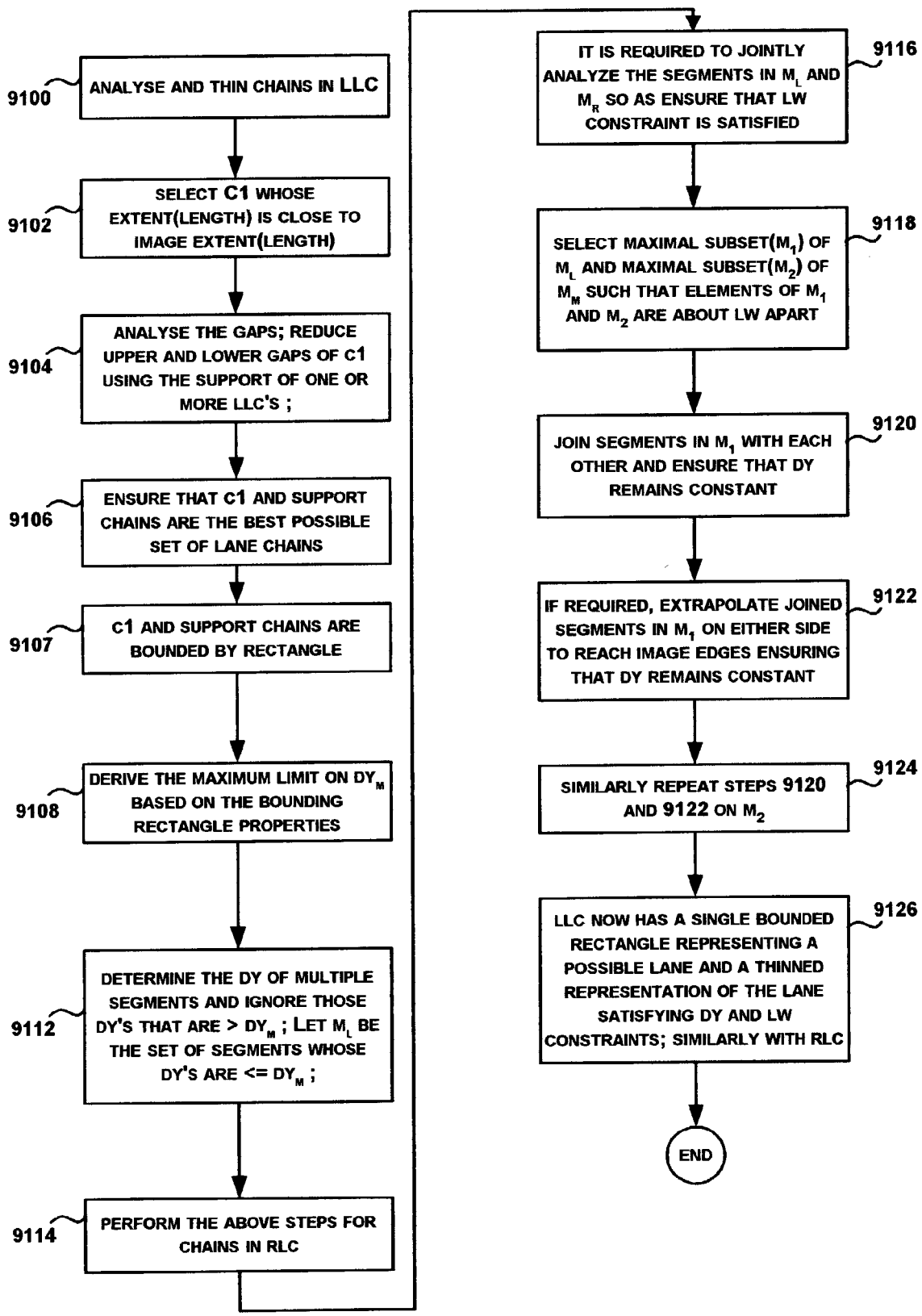
FIG. 9C: LANE FORMATION

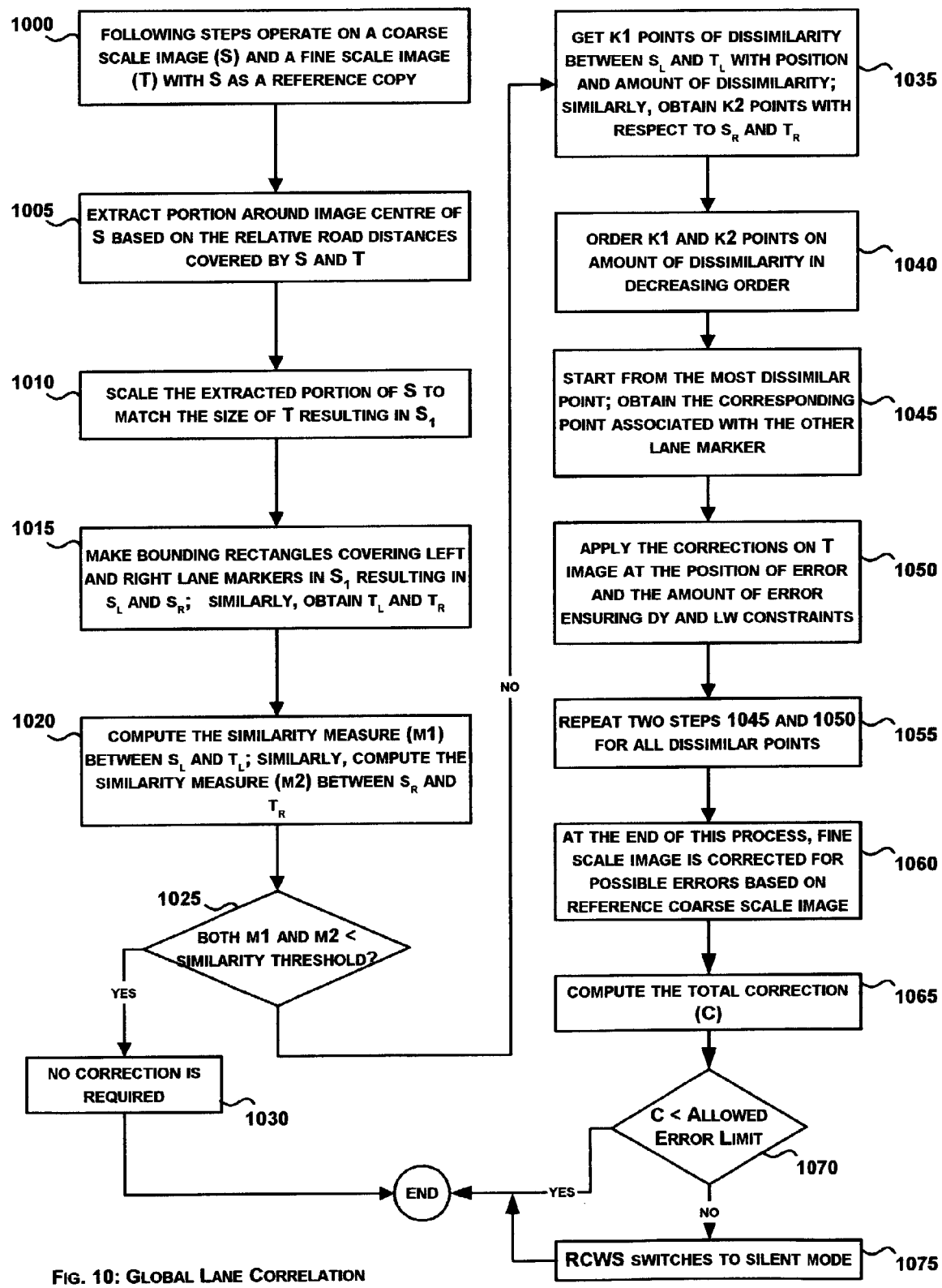
FIG. 10: GLOBAL LANE CORRELATION

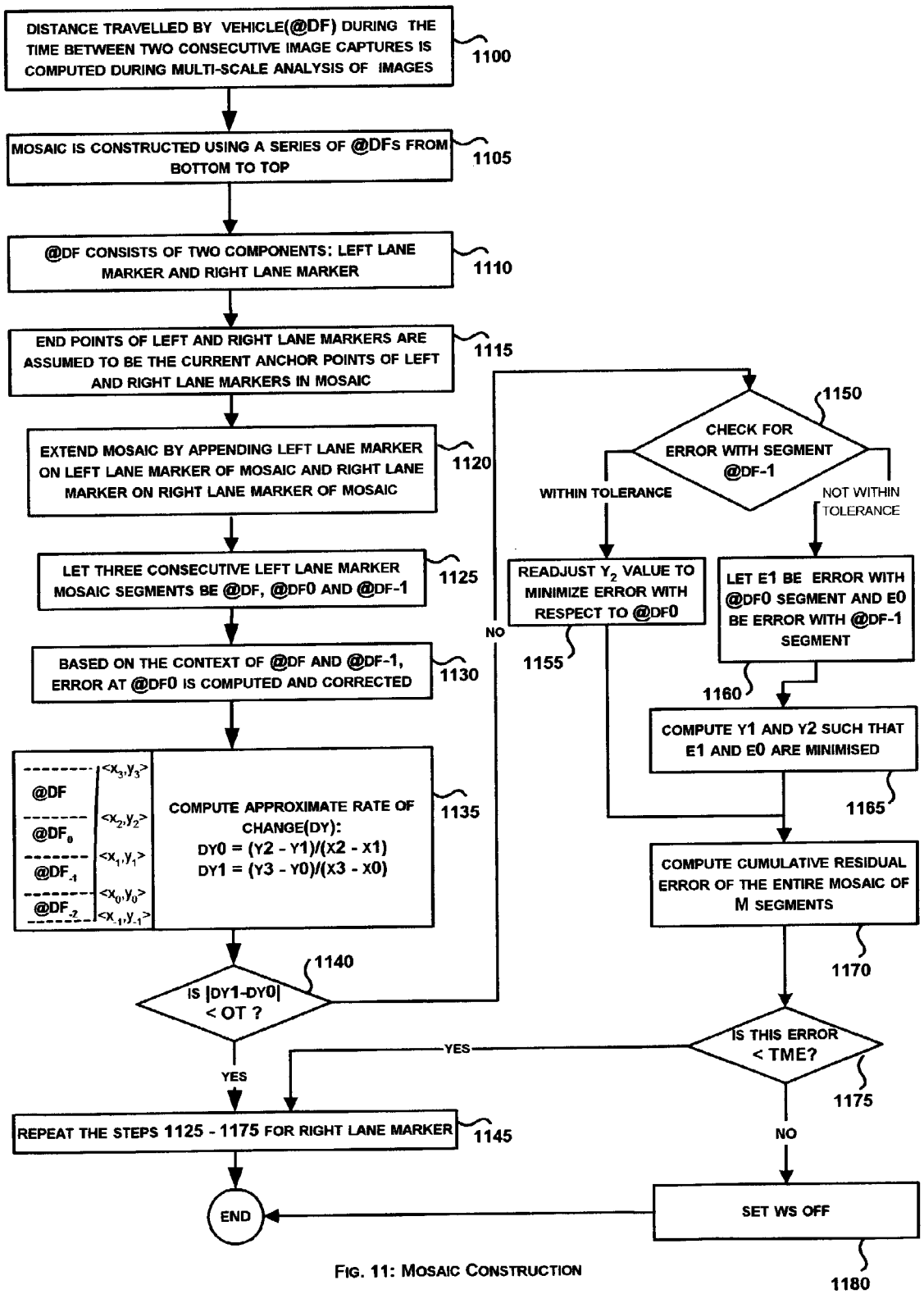
FIG. 11: MOSAIC CONSTRUCTION

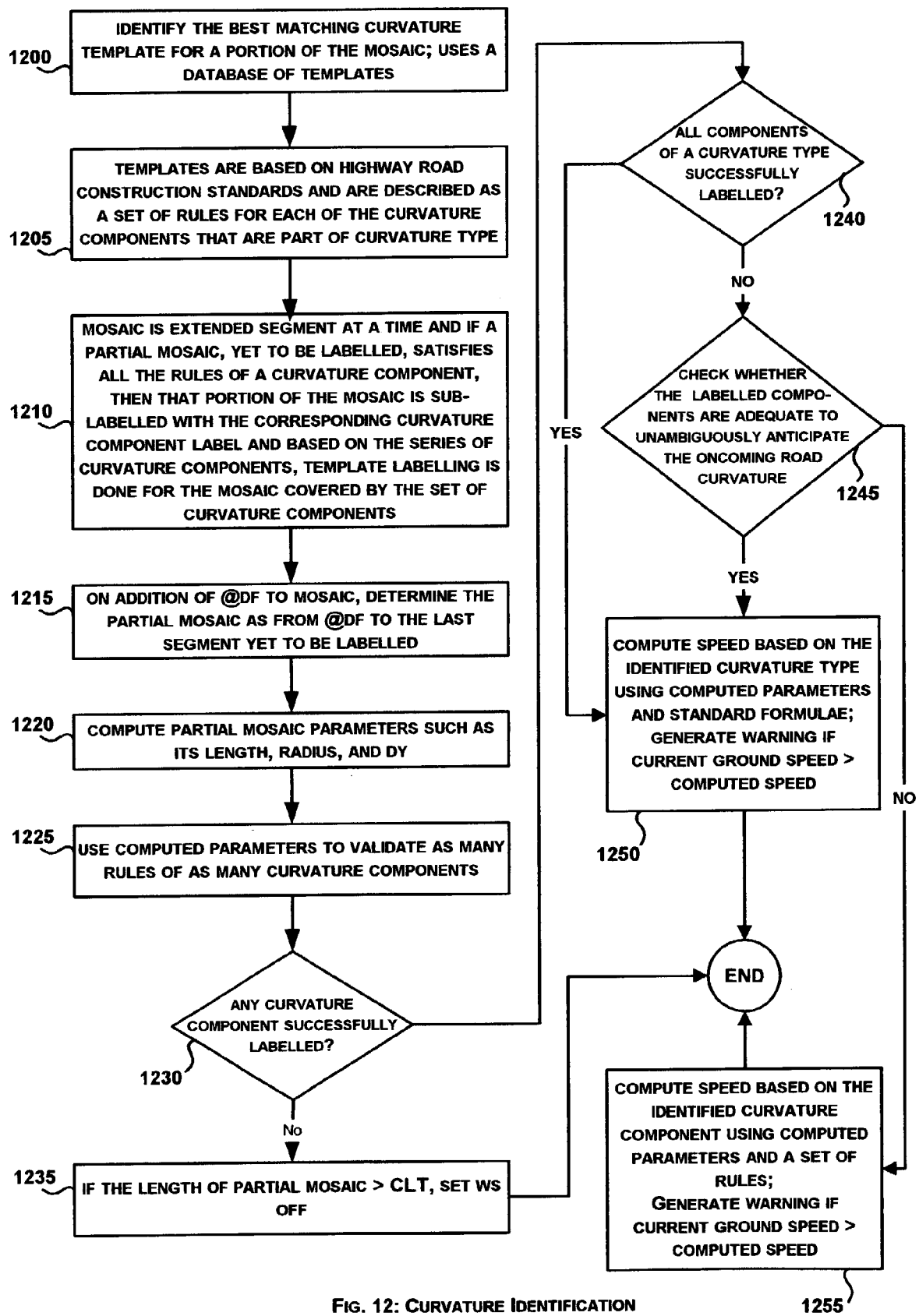
FIG. 12: CURVATURE IDENTIFICATION

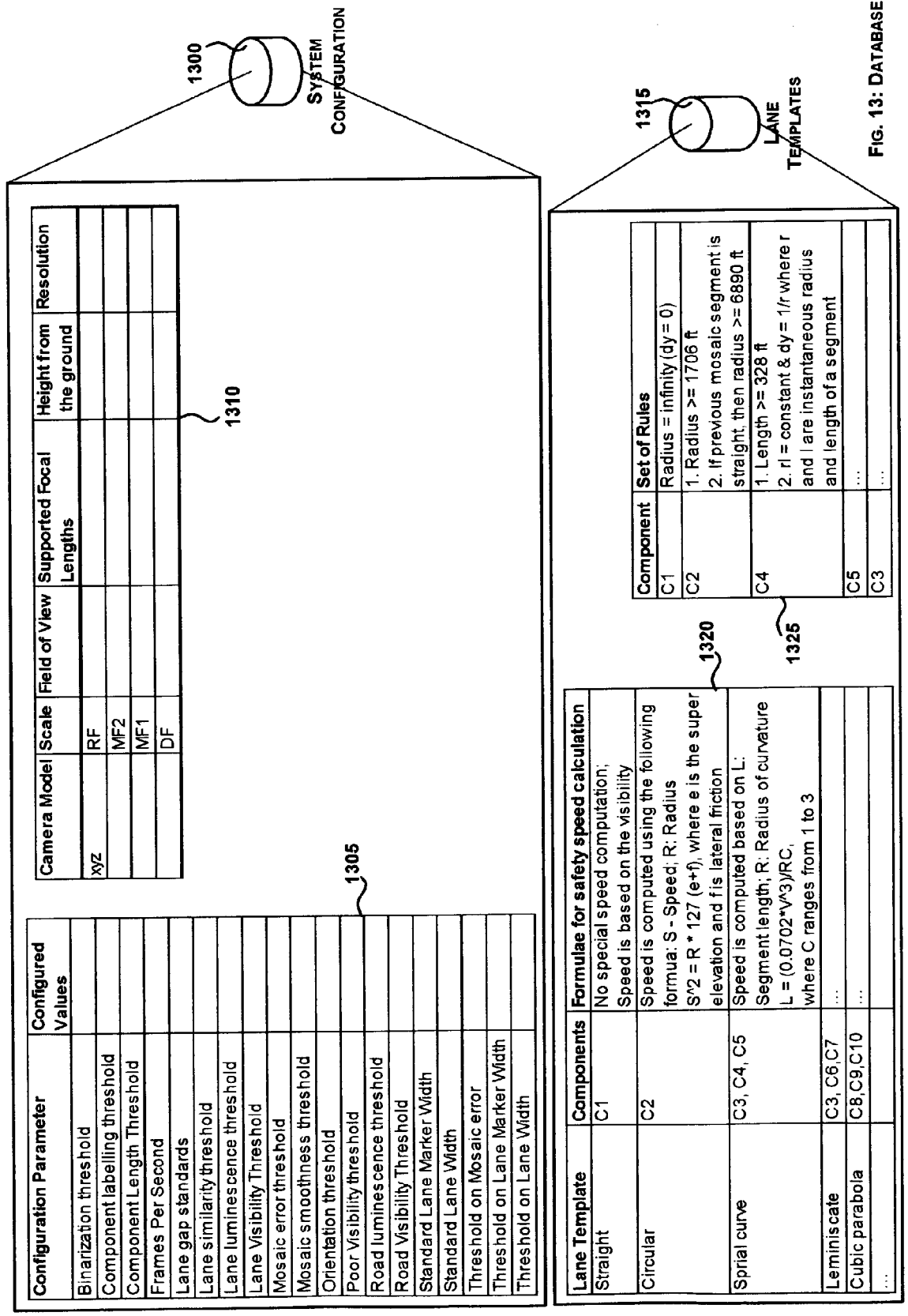
FIG. 13: DATABASE TABLES

| Dimension | Issues | Addressed in RCWS | Road conditions |
|---|---|---|---|
| Visibility | Obstruction due to other vehicles | Yes | If other vehicles are obstructing the view, then information contained in an image is partial and the look ahead is reduced so as to obtain adequate road information from the images. |
| | Shadow and other lighting effects | Yes | Affects a portion of frame: Lane, road and non-road characterization of road image help in identifying the impact and lane chain manipulations help identify lane(s) based on the available information; Affects a sequence of frames: Continuous poor visibility due to shadow and other lighting effects is recognized and RCWS goes into silent mode till visibility improves |
| | Night driving conditions | Yes | Look ahead is adjusted until the visibility improves |
| Road conditions | Lane width variation | Yes | Width is computed periodically |
| | Poor quality of lane markings | Yes | Moderate lane markings are adequate as multi-scale capturing the road images at different scales account for missing lane markings |
| | Number of lanes in a road | Yes | Position of the vehicle within the bounding lane is determined |
| | Curb | Yes | Edge detection is performed to identify curb as a lane marker |
| | Merge/split of lanes | Yes | Vehicle position is determined even during merge / split situations as the determination of vehicle position is after a suitable correction to the image to account for heading and offset errors |
| | Vertical gradient | No | The extent of vertical gradient is determined using a slope detector and RCWS is switched to silent mode whenever excess gradient is observed over a stretch |
| | Curvature | Yes | Type of curvature is determined using the constructed mosaic and standard templates |
| | Bumps | No | While vehicle is crossing a bump, the slope detector indicates the presence of a gradient and hence, images acquired during this period are not processed |
| Vehicle | Vibtraion | Yes | Vibration effect in the images are eliminated by lane chain operations and by imposing lane and lane marker width constraints |
| | Speed variation | Yes | Whenever there is a change in vehicle speed, the look ahead and related camera configurations are changed appropriately |
| | Lane change | Yes | During lane change, if heading error is too much, then this results in improper processing of images and RCWS is set to operate in silent mode; Otherwise, the error is corrected and depending on the lane visibility, appropriate missing information is filled in during mulit-scale image processing |
| Camera | Frame dropping | Yes | Occassional dropping of a frame: This is addressed by adequately extracting the road information related to the missing frame from the subsequent frames; Continuous dropping of several frames: Beyong a threshold, RCWS is switched to silent mode |
| Driver | Impulsive reactions | Yes | Missing lane information due to this error is obtained by appropriate lane chain operations; Corrections applied to address lateral offset and heading erros further reduce the impact of impulsive reactions |
| | Not sticking to center of lane | Yes | Images are corrected for offset and heading errors |

FIG. 14: CHECKLIST OF ISSUES

SYSTEM AND METHOD FOR WARNING DRIVERS BASED ON ROAD CURVATURE

FIELD OF INVENTION

The present invention relates to the field of driving assistance and more particularly, warning system to inform a driver about road curvatures while driving on highways. Still more particularly, the invention relates to systems and methods for efficient visual processing of the moderately marked roads based on the multi-scale image analysis.

BACKGROUND OF THE INVENTION

In order to ease the long driving on highways, intelligent computer based vehicles are necessary to recognize the contour of a road in real time. Towards this, one of the things that has been proposed in the literature is to provide optical or magnetic judging lines on driving ways for an optical sensor or magnetic sensor provided on the automobile to sense the judging lines. However, this requires providing judging lines on driving ways, and systems with magnetic/optical sensors are not universal.

It is also mentioned in the literature that high precision GPS can be used to find the position of a vehicle within the lane boundaries, with the help of map databases, for guidance and warning purposes. High accuracy GPS signals are expensive and if GPS is used for high-speed navigational purposes, then the frequency of the GPS signal needs to be high.

Some of the warning systems function much like adaptive cruise control and use a radar, sonar or laser beam to scan for potential obstacles and traffic changes to alert if a collision is imminent. Even though many techniques have been developed over the recent years for driving assistance, the idea of using visual information to achieve the same has become more and more popular in recent times. The use of on-board cameras and image processing of roadway scenes allow useful information to be gathered for vehicle navigation. Detecting lane boundaries is a core capability to implement advanced automotive functions such as collision warning, collision avoidance, and automatic vehicle guidance. If the lane boundaries and thus the road path can be detected, several other higher-level functions can be realized.

Varieties of methods are used in developing a vision system for intelligent vehicles. Some of these techniques are based on fuzzy control, transforms, edge gradients of lane markers, neural networks, feature tracking, and statistical methods. Statistical methods are generally based on classifying every pixel into road or non-road classes and determining road curvature based on such two-way classification. Such systems are generally not robust enough since the texture, width, color, and other features of road are quite diverse. Feature tracking relies strongly on the presence of certain artifacts in the scene such as lane markers and distinct edges, and irregularity in the presence of these artifacts limits the usability of such systems.

Some of the vision systems lack the capability to follow the road due to variations in road scenes over a wide range of possibilities. Roads typically have cracks, potholes, varying degrees of illumination including shadows and glare, obstructions such as other vehicles, rain, snow, dirt, or other foreign matter, that can cause a vision system to become disoriented.

Most of the vision-based systems require good lane markings and thus is limited to only those roads having good lane markings. The proposed invention extends the benefits of the computer vision system to provide guidance even in roads with moderate lane markings.

DESCRIPTION OF RELATED ART

U.S. Pat. No. 5,675,489 to Pomerleau; Dean A for "System and method for estimating lateral position" (issued on Oct. 7, 1997 and assigned to Carnegie Mellon University (Pittsburgh, Pa.)) describes a system for estimating lateral offset of a vehicle from a centered position on a road comprising of a video camera and a digitizer to produce digitized input signals representative of the road ahead of the vehicle and digitized input signals are used to create a perspective-free image comprised of rows and columns of pixels. The curvature of the road is determined by the amount shift required to make the features as a straight line for each row of pixels in the perspective-free image.

U.S. Pat. No. 5,684,696 to Rao, et al. for "System and method for enabling an autonomous vehicle to track a desired path" (issued on Nov. 4, 1997 and assigned to Caterpillar Inc. (Peoria, Ill.)) describes a system that, for enabling an autonomous vehicle to track a desired path, plans a continuous path to return to the desired path when the vehicle deviates from the desired path. The continuous path is determined based on the vehicle's position, the desired path, and a look ahead distance. In this case, the look ahead distance, that is a function of vehicle speed, is the distance on the desired path within which the continuous path and the desired path converge. Use of binarization of the images, identification of chains and filling the broken chains is discussed in the prior art (Massimo Bertozzi, Alberto Broggi, Denis Colla, Alessandra Fascioli, "sensing of automotive environments using stereo vision," in Proceedings ISATA—International Symposium on Automotive Technology and Automation, Florence, Italy, 1997. ISATA). The system determines the lane boundaries based on the identified chains.

A constraint based road network extraction from the aerial images is described in a white paper by Demin Xiong, titled "Automated road network extraction from high resolution images" and prepared for The National Consortium on Remote Sensing for Transportation—Hazards, Safety and Disaster Assessment (March 2001), wherein constraints are applied to identify the roads in the images. In this approach, the constraints are defined based on the geometric characteristics of the road such as road width and curvatures.

The known systems do not address the issues specific to the driving and image related errors. The present invention provides a driver warning system based on the analysis of the captured multiple multi-scale images along with the correction of lane boundaries in the images to account for driving and image related errors. Further, the present invention provides for construction of the mosaic from a sequence of road images with high precision so that the road curvature is identified with utmost accuracy. Also, the present invention proposes a rule based template matching approach to identify the road curvatures.

SUMMARY OF THE INVENTION

The present invention provides a method and apparatus for efficiently identifying the road curvatures on highways, while cruise option is ON, based on the analysis of visual information. More specifically, the present invention provides methods for warning about the safety speed whenever curvatures are encountered or visibility of the road is poor.

In accordance with the preferred embodiment of the present invention, a system is provided for warning the driver about the curvatures and about the safety speed. Included is a set of cameras that are mounted on the vehicle and capture images simultaneously. The invention advantageously utilizes the actuation of the cruise control switch to initiate the image capturing and analysis.

One aspect of the invention is to provide a device and a method for acquiring multiple multi-scale images simultaneously from multiple integrated cameras which are further analyzed collectively.

Another aspect of the invention is to provide a method for varying the look ahead distance based on the variation in speed to generate effective warnings.

Another aspect of the invention is to provide a method for reconfiguring the look ahead distance based on visibility criteria and generate speed related warnings.

Yet another aspect of the invention is to provide a method for correcting the images for driving errors such as heading error and offset error within the lane boundaries to ensure an accurate analysis of the road curvature.

Yet another aspect of this invention is to provide a device and a method for accurately constructing a mosaic based on the multi-scale image analysis.

Yet another objective of this invention is to generate speed warning based on the comparison of the characteristics of the mosaic segment with the curvature templates using a corresponding set of rules.

BRIEF DESCRIPTION OF DRAWINGS

FIG. 1 illustrates the architecture of Road Curvature Warning System.

FIG. 2A illustrates configuration of multiple cameras.

FIG. 2B illustrates the frame characteristics.

FIG. 2C illustrates the reconstruction of road lane.

FIGS. 3A–3L illustrate the line drawings related to the images obtained from multiple cameras, preprocessed images and multi-scale analyzed images.

FIG. 4 illustrates the workflow of RCWS.

FIG. 5 describes the image preprocessing steps.

FIG. 5A illustrates the vehicle with heading error=0 and offset error=0 within the lane boundaries.

FIG. 5B illustrates the vehicle with heading error=0 and offset error not equal to 0 within the lane boundaries.

FIG. 5C illustrates the vehicle with non-zero heading and offset errors within the lane boundaries.

FIG. 6 describes the procedure related to periodic computation of road parameters.

FIG. 7 describes the procedure related to look ahead distance computation and system reconfiguration.

FIG. 7A describes the procedure related to the checking of visibility criteria.

FIG. 8 describes the multi-scale processing of the images to construct the mosaic.

FIG. 9 describes the procedure related to the creation of lane chains.

FIG. 9A describes vertical lane chain merging based on pairing.

FIG. 9B describes vertical lane chain merging based on correlation.

FIG. 9C describes the procedure to form lane based on lane chains.

FIG. 10 describes the procedure related to global lane correlation.

FIG. 11 describes the procedure related to the construction of the mosaic.

FIG. 12 describes the procedure to identify the curvatures and to generate warnings.

FIG. 13 describes the various database tables that are part of RCWS system.

FIG. 14 lists the issues related to RCWS system.

DETAILED DESCRIPTION OF THE PREFERRED EMBODIMENT

FIG. 1 illustrates the architecture of the road curvature warning system (RCWS) (100). RCWS is activated when a driver selects the cruise option (105). While cruise option is ON, normally, the driver is somewhat relaxed; hence, the activated RCWS assists the driver by warning about the curvatures ahead so that the driver can take appropriate actions. RCWS interacts with the vehicle control system to get certain inputs for setting the RCWS system parameters (110). When cruise option is turned OFF, RCWS goes into silent mode of operation.

The RCWS generates warnings about the road curvatures while driving on highways. RCWS uses four vertically aligned forward-looking cameras, placed at the center top of the ego-vehicle (115). Cameras are integrated in such a way that the focal point remains the same for all the cameras (based on a flat road assumption), but the zoom factors are different. System configuration database (120) stores both intrinsic and extrinsic camera parameters associated with all the cameras. Typically, camera zooms are configured in such a way that DF-camera covers about 10 ft of the road, MF1-camera covers about 25 ft, MF2-camera covers about 50 ft, and RF-camera covers about 70 ft. The cameras are configured to acquire n (configurable parameter) frames per second and the cameras are synchronized to acquire the images simultaneously.

Camera controller (125) controls the tilt and the zoom of the cameras based on the computed look ahead distance. Camera controller interfaces with the slope detector to find whether the road is flat or has a vertical gradient (128). If there is a vertical gradient, then the RCWS does not process the images and discards them. If considerable number (a derived parameter using look ahead distance parameter) of consecutive images are discarded, then RCWS goes into silent mode till favorable road conditions are attained. Look ahead distance is set dynamically based on the vehicle speed and RCWS obtains the ground speed based on a ground speed sensor (130) to compute an appropriate look ahead distance. In order to simplify the computational procedure, in a preferred embodiment, a lookup table is used (135). This lookup table provides a mapping between speed range and look ahead distance along with zoom and tilt camera parameter values.

The RCWS system uses the speed to query the lookup table to obtain the necessary look ahead distance and appropriate camera parameter values. For the configured look ahead distance, if the visibility of the lane is poor, the look ahead is gradually reduced till lane visibility is improved or becomes lesser than Min Look Ahead Distance and an over-speed warning is generated if appropriate. The typical look ahead distance is related to the stopping distance and hence, whenever there is a change in the vehicle speed, the look ahead is also appropriately changed.

Once the cameras are set to acquire images, all the four cameras acquire the images simultaneously and these four images are preprocessed sequentially starting from RF by RCWS preprocessor (140). RCWS preprocessor processes the images to eliminate the driving errors and computes the perspective free image and are scaled to account for the IPM process and the variations in camera parameters. These images are binarized to indicate the lane with the 1's and the road with 0's (142). Binarized images are then processed to compute road parameters, namely, lane width and lane marker width (144). These parameters are used to reduce the effect of noise/vibration on the acquired images. Based on ground speed, the look ahead distance is obtained from the lookup table (146) and this look ahead distance is adjusted to suit the road visibility conditions (148). At the end of preprocessing step, scaled and rectified images along with appropriate road and system parameters are obtained.

Preprocessed four images are provided to RCWS processor for further processing to construct the road scene (152). To begin with, the images are analyzed independent of each other to identify the most plausible lane in each of these images (154). The lane is identified based on the constrained analysis of left and right lane markers using road and system parameters. Further corrections to the identified lanes in the four images are based on multi-scale analysis of the images (156). Road scene is constructed as a mosaic that is a geometrical form of a lane (158).

Multi-scale processing involves the computation of mosaic segment (also referred as @DF) based on the analysis of the four binarized images. If the error computed during the multi-scale processing is significantly more, then RCWS switches to silent mode and switches back only when favorable conditions are observed. Otherwise, @DF is used to construct the mosaic. While using @DF to extend the mosaic, various contiguity constraints based on the lane/road properties are applied. The extended mosaic is then compared with the known lane templates that are present in the lane template database (165). Length, Radius and Rate of change of curvature are used to match the mosaic with the templates to determine the most appropriate curvature type that describes the observed road segment (160). Based on the identified curvature type, speed limits are computed and the Warning Generation System generates a warning if the vehicle ground speed exceeds the computed speed limits (162).

FIG. 2A illustrates the arrangement of the four cameras on the vehicle to constantly grab the road images. The four cameras are set up at different heights with variable zoom and tilt parameter values. However, the focal point of all these four cameras are same so as to obtain four multi-scale images of the road around a point that is look ahead distance away from the vehicle. Tilt of the cameras (205) is set based on their heights from the ground and the look ahead distance. Typically, DF camera has the highest zoom and captures about 10 ft of the road information, whereas MF2 captures about 25 ft, MF1 about 50 ft and RF about 70 ft. The look ahead distance is dependent on the speed of the vehicle and visibility conditions, and the camera parameters are altered whenever there is a change in look ahead distance. Further, it is ensured that under all conditions, the focal point of the cameras remain the same.

FIG. 2B illustrates the frame characteristics needed for the multi-scale image analysis. A vehicle traveling at a known speed is set with an appropriate look ahead distance and step 210 describes the relationship between the grabbed four multi-scale images with respect to the road and the look ahead distance. The segment @DF that is at the center portion of the DF image, that is in turn at the center of the MF1 that is in turn at the center of MF2 and that is in turn at the center of RF, is used in the construction of the mosaic. The extent of @DF is based on the current ground speed and some times it could exceed the extent of DF.

FIG. 2C illustrates the mosaic (215) that is constructed using a series of @DF's obtained from the image analysis.

FIG. 3 illustrates the motivation behind the approach. Using visual information to assist in driving is complicated by the fact that the driver is also looking at the road and it is challenging because the system should be able to analyze the visual information efficiently on time. It is very crucial to decide on the amount of visual information that has to be analyzed at any point in time. Too much of information takes a lot of time to process and too less information is error prone and is not useful. Hence, it has to be ensured that the adequate information that is less error prone is processed efficiently.

The first set of four line drawings (FIG. 3A to FIG. 3D) illustrates the original multi-scale images (scale 1 through 4) captured by the four cameras. These images have the perspective view of the road from the vehicle. Even though all the four images are focused at a single point on the road, they cover different road extents and provide different amount of information. These images are processed to remove the perspective effect (FIG. 3E to FIG. 3H). The perspective free images are processed using chain operations to eliminate noise and errors (FIG. 3I to FIG. 3L). The information contained in the coarse scale images is used to remove ambiguities encountered while processing the finer scale images. Thus, the images are correlated to get best-fit description of the road and to obtain the best @DF. Comparing the FIG. 3D and FIG. 3L gives an indication of the power of the approach to handle situations where the lanes are either poorly visible or poorly marked.

FIG. 4 illustrates the workflow of the RCWS. Four vertically aligned forward looking cameras are placed at the center top of the ego vehicle and cameras are integrated in such a way that at any point of time, the focal point is same while the zoom factors are different (400). RCWS gets activated when the driver selects the cruise option (402). Based on the current vehicle speed, look ahead is computed and the cameras are configured using the retrieved zoom and tilt (405) parameter values. Cameras are similarly reconfigured whenever there is a change in vehicle speed or the visibility of the road in the images is poor.

Four images are obtained from the four distinct configured cameras simultaneously, the obtained images are preprocessed, and are used to identify lane chains (410). Periodically, compute LW and LMW. This periodic computation helps in adjusting the computed road parameter values as lane width and lane marker width are prone to change along the road. A check is made to ensure that visibility is good (415) and VC is set to GOOD if visibility is indeed good and is set to BAD otherwise. Perform multi-scale analysis to determine @DF (418). If the overall error during multi-scale image processing is less than a certain threshold, then MS is set to GOOD and otherwise, it is set to BAD. The determined @DF segment is used to extend the mosaic by applying lane/road contiguity constraints (420). Compute Mosaic Extension error and if this error is less than a threshold, set ME to GOOD, otherwise, set to BAD. A check is made to ensure that VC is GOOD, MS is GOOD, and ME is GOOD (425). If so, curvature type is identified by analyzing the mosaic with the help of lane templates (428) and appropriate warning is generated based on identified curvature type and current ground speed (430). A check is made to ensure that cruise option is still ON (430) and if so, steps 410 and onwards are performed. If cruise option is off (430), then periodically, a check is made to determine whether cruise option is ON (440 and 402). On other hand, if any one of VC, MS or ME is not GOOD (425), RCWS is set to silent mode and during the silent mode, no warning gets generated.

FIG. 5 describes the preprocessing performed on the images that are captured. Steps 505 through 525 are performed on RF, MF2, MF1 and DF images independent of each other (500). RCWS preprocessor performs normalization operation on the acquired image to normalize the variations in lighting conditions such as night driving, shadows, cloudy conditions and daylight conditions (505). Performs IPM operation to get perspective free image (510). If required, performs rotation and perspective change operation on the image to correct heading and offset errors (515). Since intrinsic/extrinsic parameters of the cameras are different, the image after an IPM operation needs to be scaled to account for these parameter variations (520). Image is binarized using the binarization threshold obtained after edge detection operation (525). The observation is that the intensity of pixels that are part of a lane is distinct from that of road pixels. In order to determine the intensity range for lane marker pixels, edge detection operation is undertaken and the intensity of the edge pixels are used to determine the threshold for binarization. At the end of this preprocessing step, binarized, corrected images of each of the four original images are obtained.

FIG. 5A illustrates the ideal position of the vehicle and hence, cameras, within a lane boundary. That is, camera is at the center of the lanes (offset=0) and parallel to the lane (heading error=0). In this case, the captured images do not need any correction.

FIGS. 5B and 5C illustrate the cases where the images need to be corrected for the errors.

FIG. 5B illustrates the case wherein the vehicle is away from the center (offset not equal to 0), but parallel to the lanes (heading error equal to 0). In this case, the image is corrected for offset error by using field of view and lane edges information.

FIG. 5C illustrates the case wherein the vehicle is away from the center (offset not equal to 0), and non-parallel to the lanes (heading not equal to 0). Based on the amount of heading error and lateral offset, an appropriate transformation matrix is determined and used to correct the image for both heading and offset errors.

maximum density is selected for the possible identification of lane width (625). The centroid of the selected cluster is verified against standard lane widths present in the database (630) and if the centroid is not within the allowable tolerance limits of a standard lane width, then a check is made for the availability of clusters for analysis (635). If no more clusters are available, then processing is undertaken for the subsequent count-0 column (615). Otherwise, next high-density cluster is selected (640) and steps 630 and 635 are repeated. If a cluster with centroid within allowable tolerance limits is found (630), then the cluster centroid is used as the lane width (XLW) (645). Similarly, clusters are identified for the two count-1 columns on either side of the count-0 column under consideration (in some cases, especially at image edges, there may be only one count-1 column) and the lane marker widths XLMW1 and XLMW2 are computed (648). Based on XLW, adjust counts in count-0 column under consideration (650). Similarly, based on XLMW1 and XLMW2, adjust counts in two count-1 columns on either side of count-0 under consideration (652). Updated count matrix is reapplied, to reduce the effect of noise, to the binarized image (BI) generating RBI (654). BI is corrected in such a way that the count matrix generated from RBI tallies with the updated count matrix. Using the updated count matrix, correct the relevant portion of OI to generate ROI (656). The correction to OI is carried out to ensure that noisy pixels that are identified are kept track of and are appropriately handled whenever these images are further used. the When the above process is completed for all the count-0 and count-1 columns, the lane width (XLW) and lane marker width of the lanes (XLMW1 and XLMW2) closest to the center of the image are taken as the current lane width ($C_{LW}$) and lane marker width ($C_{LMW}$) (660). Select lane pixels from ROI that are related to $C_{LW}$, cluster these pixels, select a cluster with maximum density, and set the cluster centroid as RGB-Lane (662). Similarly, select pixels from ROI that are related to $C_{LMW}$, cluster these pixels, select a cluster with maximum density, and set the cluster centroid as RGB-LM. These parameters are used during the further processing of the road images.

The above procedure to compute the road parameters, LW and LMW, is illustrated with an example below.

$$T = \begin{bmatrix} 01111000000000000000111100000000000000001110000000000000000111 \\ 01110000000000000000111000000000000000001110000000000000001111 \\ 01111000000000000000111100000000000000001111000000000000000011 \\ 00111000000000000000000110000000010000001110000000000000000111 \\ 00111000000000000000000000000000000000001110000000000000000011 \end{bmatrix}$$

FIG. 6 illustrates the periodic computation of lane width and lane marker width of the lane related to the vehicle in a multi-lane road. The preprocessed RF image is used to compute LW and LMW (605). A count matrix of 0's and 1's is constructed based on the preprocessed RF image (610) in which consecutive 0's and consecutive 1's are counted. A random K sample rows are selected from the input RF image and for each count-0 column, following steps are repeated. The count-0 counts of the selected columns of the K samples are clustered keeping the allowable lane width tolerance ($T_{1w}$) as the maximum cluster radius (620). In order to account for the various errors and noise, a cluster with Derive the count matrix C, based on T where T is an RBI:

| Labels | 0's | 1's | 0's | 1's | 0's | 1's | 0's | 1's | 0's | 1's |
|---|---|---|---|---|---|---|---|---|---|---|
| C = | 1 | 4 | 17 | 3 | 16 | 3 | 17 | 3 | | |
| | 1 | 3 | 17 | 3 | 17 | 3 | 16 | 4 | | |
| | 1 | 4 | 16 | 4 | 15 | 4 | 18 | 2 | | |
| | 2 | 3 | 19 | 2 | 8 | 1 | 6 | 3 | 17 | 3 |
| | 2 | 3 | 36 | 3 | 18 | 2 | | | | |

Since the example matrix does not have too many rows, we set K to be 5. With the configuration parameters, $T_{lw}=2$ and $T_{lmw}=1$, the clusters are formed as below. The first count-0 is not processed as it is at the edge of the image.

| Labels | 0's | 1's | 0's | 1's | 0's | 1's | 0's | 1's | 0's | 1's |
|---|---|---|---|---|---|---|---|---|---|---|
| C = | 1 |   |   |   |   |   |   |   | 17 | 3 |
|   | 1 | 4 | 17 | 3 | 16 | 3 | 17 | 3 |   |   |
|   | 1 |   |   |   |   |   |   |   |   |   |
|   | 2 | 3 | 17 | 3 | 17 | 3 | 16 | 4 |   |   |
|   | 2 |   |   |   |   |   |   |   |   |   |
|   |   | 4 | 16 | 4 | 15 | 4 | 18 | 2 |   |   |
|   |   | 3 | 19 | 2 | 8 | 1 | 6 | 3 |   |   |
|   |   | 3 | 36 | 3 | 18 | 2 |   |   |   |   |

Using the camera configuration information, let us suppose that the approximate number of pixels for standard lane widths are 10, 15 and 20. Similarly, let the standard lane marker width be 3 pixels.

Using the above generated clusters, cluster centroids with the maximum density that are closest (within $T_{LW}$ tolerance) to the standard LWs and LMWs are given below:

| For the labels | 0's | 1's | 0's | 1's | 0's | 1's | 0's | 1's |
|---|---|---|---|---|---|---|---|---|
|   | Edge | 3 | 17 | 3 | 17 | 3 | 17 | 3 |

Note that the pixels related to the last count-0 and count-1 columns have been reassigned to appropriate count-0 and count-1 columns during the noise elimination process.

Using the centroids of the clusters, the count C is rearranged as,

| Labels | 0's | 1's | 0's | 1's | 0's | 1's | 0's | 1's |
|---|---|---|---|---|---|---|---|---|
| C = | 2 | 3 | 17 | 3 | 17 | 3 | 17 | 2 |
|   | 1 | 3 | 17 | 3 | 17 | 3 | 17 | 3 |
|   | 1 | 3 | 17 | 3 | 17 | 3 | 17 | 3 |
|   | 2 | 3 | 17 | 3 | 17 | 3 | 17 | 2 |
|   | 2 | 3 | 17 | 3 | 17 | 3 | 17 | 2 |

The following is the rearranged T, based on the C matrix:

$$T = \begin{bmatrix} 00111000000000000000111000000000000000001110000000000000000011 \\ 01110000000000000001110000000000000000011100000000000000000111 \\ 01110000000000000001110000000000000000011100000000000000000111 \\ 00111000000000000000111000000000000000001110000000000000000011 \\ 00111000000000000000111000000000000000001110000000000000000011 \end{bmatrix}$$

Using these count-0 and count-1 centroid information, the system parameters is set as, $C_{lw}=17$ and $C_{lmw}=3$.

FIG. 7 illustrates the look ahead distance computation and system reconfiguration whenever there is a change in vehicle speed. Camera controller (CC) obtains the current vehicle speed with the help of ground speed sensor (700). CC reads the look ahead distance from SLAD look up table based on the current speed of the vehicle (705). The corresponding tilt of all the cameras and zoom factors are obtained. The SLAD look up table is organized in such a way that the various parameters including look ahead distance and camera parameters are provided for different speed ranges. Such a grouping of speeds avoids frequent reconfiguration. These parameters are affected smoothly and the images are acquired and processed during the change over period (710). If the lane and road visibility are good, the look ahead distance is retained as obtained (715). Otherwise, CC reduces the look ahead of all the cameras by adjusting the tilt (720). If the reduced look ahead is lesser than the minimum look ahead distance (725), CC warns the driver that RCWS is not active due to visibility problems and WS is set to off (730). Else, CC checks whether the visibility condition has improved (735). If it has not improved, CC iteratively reduces the look ahead and checks for the improvement in visibility. When the visibility criterion is met, CC calculates the look ahead based on the current tilt (740). If computed look ahead falls into different speed range based on SLAD lookup table (745), then the driver is warned about the speed (750). RCWS system is reconfigured with the current look ahead distance and camera parameters and the configuration is not changed until there is a further change in vehicle speed or visibility conditions.

FIG. 7A describes the visibility criteria checking. To check whether the visibility criterion is met, the system performs the following steps on the RF ROI image (760). Obtain the current RGB-Lane and RGB-LM parameters (765). These two parameters provide the RGB values that describe the current lane and lane marker pixel values respectively. Compute the total number of lane, lane marker, and non-road pixels present the image using RGB-Lane and RGB-LM parameters (770). Note that if a pixel is within RGB-Lane pixel value plus or minus Lane Luminescence Threshold (LLT), then the pixel is marked as lane pixel and similarly if a pixel is within RGB-LM plus or minus LM Luminescence Threshold (LMLT), then the pixel is marked as LM pixel. A pixel that is neither lane nor road pixel is marked as non-road pixel. During the course of the categorizing pixels, the noisy pixels are not considered for categorization and the information regarding these noisy pixels are contained in the ROI image. A check is made to determine whether the percentage of lane pixels exceeds Lane Visibility Threshold (LVT) (775) and if so, further check is made to determine whether the ratio of lane to non-road number of pixels exceeds Road Visibility Threshold (RVT) (778). If both the above conditions are satisfied, a check is made if WS is OFF (780). If off, then PV-counter is set to 0 if it is presently less than 0 (782). And, PV-counter is decremented to ensure that improvement in visibility is a sustaining one (784) and if PV-counter becomes less than a threshold, (786) then visibility condition is set as good and WS is set to ON (788). If any of the conditions (775 and 778) is not met, a check is made to determine if WS if ON (790). Not meeting any one of the two conditions in 775 and 778 with WS being ON indicates that visibility conditions have started deteriorating. If WS is ON, PV-counter is set to 0 if it is less than 0 (792). And, PV-Counter is incremented (794). If the visibility condition is not continuously good, it is appropriate to set WS OFF and PV-Counter is used for this purpose. A check is made to determine whether PV-Counter exceeds a threshold (796) and if so, set visibility condition as not good and set WS OFF (798).

FIG. 8 illustrates the multi-scale processing of the images to re-construct the road scene. RCWS processor performs following operations on already preprocessed, binarized (BI) images at different scales, namely, RF, MF2, MF1 and DF images. Compute the distance traveled, @DF, by the vehicle during the time between the previous set of image acquisition and the current set of image acquisition (800). Following operations are performed on the RF, MF2, MF2 and DF images, independent of each other (805): (a) Lane chains are created; (b) Lane chains are merged based on pairing; (c) Lane chains are merged based on correlation; and (d) Lanes are formed based on merged lane chains. Steps 810 through 820 use the information contained in images at different scales to eliminate noise and errors. MF2 lane is further corrected for any of the remaining errors by correlating MF2 lane image with the scaled, extracted RF lane image (810). The scaling and extraction of the RF image is required because of the differences in image scales and road distances represented by these two images. Similarly, MF1 and MF2 are correlated (815), and DF and MF1 are correlated (820). The corrected DF lane image is used to extract @DF portion to be used in road mosaic construction (825). If the required extent of @DF is more than the extent of DF image, then the remaining portion is extracted from coarser scale images (MF1, MF2, and RF).

FIG. 9 describes the steps involved in the creation of lane chains. Steps 904 through 920 are used to form local chains (902). Based on the vehicle position on road, determine two lane markers that are on either side of the center of the image that is the position of the vehicle (904). Define a bounding rectangle that covers completely these two lane markers and exclude the pixels that are outside this rectangle from further processing. The process of creating local chains uses the database containing LW, LMW, and lane and road models (906). Analyze the image from left to right and top to bottom and locate the first anchor point (908). Collect the pixels that are part of the chain that is under construction based on the presence of neighboring pixels within the distance $EPS_P$ from the adjacent pixels (910). In other words, even if "1" pixels separated by "0" pixels, so long as number of such 0 pixels is less than $EPS_P$, these "1" pixels are still considered adjacent and are made part of the same chain. Define a bounding rectangle around the pixels that are part of the chain (912). Check for the presence of v-neighbors for the row of pixels under consideration (914). A v-neighbor is defined as a row of "1" pixels that is below the last row of the chain under construction within $EPS_P$. In other words, as in the case of horizontal neighbors, vertical neighbors are located within some tolerance to account for noise in the image. Again as in the case of h-neighbors, collect pixels based on the presence of v-neighbors within $EPS_P$ (916). The steps 910–916 are repeated until there are no more v-neighbors and in such a case, a check is made to determine whether there are any more chains to be explored (918). If so, steps from 908 are performed. Otherwise, the identified chains are marked as LLC or RLC based on whether the anchor point of a chain is to the left or right of the center of the image (920).

FIG. 9A describes the steps involved in vertical lane chain merging based on pairing the LLC chains with the RLC chains. Select a chain (C1) with LLC label with the least anchor point <x1, y1> (950). The objective is to start from the top to process identified chains and to locate the corresponding pair in with RLC label. Look for the corresponding chain (C2) in RLC if C1 is in LLC and in LLC if C1 is RLC (952). The selected chain, C2, is constrained to be within a tolerance of LW from C1. Further, the anchor point <x2, y2> of C2 is such that y2 is close to y1. If such a chain is found (954), then the extents of C1 and C2 are compared (956). If length of C1 exceeds C2+some tolerance (958), then define the anchor point <x1, y1> as <x2, y2+length of C2> (960). Else, set C1 as C2 and define the anchor point <x1, y1> as <x1, y1+length of C1>(962). The processing is continued from step 952 onwards. If on the other hand, no corresponding chain is found (954), if a partial match has been found (964), merge LLC elements together and RLC elements together that are part of the pair. Such mergings should help reduce the impact of noise in the image in overall processing. Select next chain with least anchor point (966). If such a chain is found, (986) the processing is continued from step 952.

FIG. 9B describes the steps involved in vertical merging of the LLC chains and RLC chains. The objective is to identify the LLC/RLC chains from the top to merge with other LLC/RLC chains based on the comparison of chain characteristics. Select a chain (C1) with LLC label with the least anchor point <x1, y1> (975). Compute C1 chain parameters such as length l1, breadth b1, and rate of change of lane pixels per row, dy1 (978). For each chain C2 with anchor point <x2, y2> in LLC, (980) perform the steps from 982 through 986. Compute C2 chain parameters, length l2, breadth b2, and rate of change, dy2 (982). Compute v-correlation factor based on the following constraints: similarity in dy1 and dy2; if there is a gap between C1 and C2, it should be less than or equal to standard lane gap; x2 should be about x1±(y2−y1)*dy1 (984). The above constraints are to identify lane segments that are most probably part of the same lane. The constraint related to the similarity in dy1 and dy2 reinforces the general rule of lane marking on highways which states that the rate of change of lane curvature is constant. And, the constraint related to the gap in between two lane segments accommodates the fact that, in some cases, the lanes are purposely separated by about standard lane gap. Finally, the constraint related to x1 and x2 enforces that the two lane segments of a lane must have same rate of change and orientation. If more lane chains are present in LLC, then the steps 982 and 984 are repeated (986). Else, having determined the pair-wise vertical correlation, the chains with v-correlation factor>V-CORR are selected (988). If there are chains with v-correlation factor>V-CORR (990), these chains are merged and the merged chain replaces the original chains in LLC (992). The merging operation is made easier by the imposed constraints while selecting the chains. Further, the merging operation also results in a single, connected chain from the multiple segments. The basic principle of merging is based on constancy of rate of change and similarity in orientation. From the remaining chains in LLC, a chain C1 is selected (994) and the steps from 978 to 994 are performed (996). The selection of next chain C1 is based on the fact C1 has not yet been compared with at least one other chain in LLC. If no such C1 exists (996), then this indicates that the processing of chains in LLC is over. The chains in RLC are similarly analyzed by performing the steps from 975 through 996 (998).

FIG. 9C describes the steps involved in the formation of left and right lane markers based on local chain information. The LLC and RLC chains are analyzed to identify one or more chains that collectively satisfy dy and LW constraints. Analyze and thin chains in LLC to determine their relative properties such as length and dy (9100). Select C1 such that the length of C1 is close to the image length (9102). If this chain doesn't cover the image from top to bottom, it is necessary to fill in the gaps (9104). The upper and lower gaps are reduced by selecting appropriate chains from LLC. Constraints such as minimum overlap with C1 and use of minimum number of chains in filling the gaps are applied in the process of the selection of chains. Ensure that C1 and the selected chains are the best possible combination of lane chains given LLC (9106). Having selected the chains, C1 and these selected chains are bounded by a rectangle so as to reduce the number of chains and implicitly merge them to generate a single chain (9107). Use this bounded rectangle to compute the maximum possible $dy_m$ of the chain segments (9108). The thinned lane chains are further smoothened by applying LW and dy constraints (9112). The dy of multiple segments that are part of the thinned image are computed and those segments whose dy exceeds that of $dy_m$ are eliminated and let $M_L$ be the set of segments whose dy less than or equal to $dy_m$. Steps 9100 through 9112 are performed for the chains in RLC to determine $M_M$ (9114). It is required to jointly analyze the segments in $M_L$ and $M_R$ so as to ensure that LW constraint is satisfied (9116). Select a maximal subset, $M_1$, of $M_L$ and a maximal subset, $M_2$, of $M_R$ such that chains in $M_1$ and $M_2$ are about LW apart (9118). This ensures that when finally left and right lane markers are formed, these two lane markers are about LW apart. Join segments in $M_1$ and ensure that dy remains about the same (9120). This merging is directed by the dy constraint and any extension of chains is bound by this constraint. If required, extrapolate joined segments in $M_1$ on either side to reach image edges (9122). Similarly, repeat steps 9120 and 9122 with respect to $M_2$ (9124). At the end of the above steps, LLC contains the formed left lane marker, a thinned version, that satisfies the constraints related to dy and LW (9126). Similarly, RLC contains a formed right lane marker.

FIG. 10 describes the steps involved in correlating the lane markers across multi-scale images. Following steps operate on a coarse scale image S and a fine scale image T. Due to the nature of multi-scale images, it is appropriate to choose S as a reference copy (1000). Extract a portion around the image center of S based on the relative road distances covered by S and T (1005). Scale the extracted portion of S to match the size of T resulting in S1 (1010). Make bounding rectangles covering the left and right lane markers in S1, resulting in $S_L$ and $S_R$ (1015). Similarly, obtain $T_L$ and $T_R$. Compute the similarity measure (M1) between $S_L$ and $T_L$ (1020). Similarly, compute the similarity measure (M2) between $S_R$ and $T_R$. If both M1 and M2 are within the configured similarity threshold (1025), then no correction is required for the fine scale image T (1030). Otherwise, the fine scale image is corrected as described by following steps. Get k1 points of dissimilarity between $S_L$ and $T_L$ with position and amount of dissimilarity (1035). That is, as compared with the reference image S, T differs at various pixels and the position of dissimilarity is the y-coordinate where S and T images differ, and the amount indicates the difference in x-coordinates of a lane pixel in S and in T at y position. Similarly, obtain k2 points with respect to $S_R$ and $T_R$. Order k1 and k2 points on the absolute value of the amount of dissimilarity in decreasing order (1040). Start from the most dissimilar point and this point could be part of either left lane marker or right lane marker. Obtain the corresponding point associated with the other lane (1045) if available. Apply the corrections on T image at the position of error under consideration and the amount of error ensuring dy and LW constraints (1050). In other words, the corrections are applied and on the resulting lane markers, a check is made for constancy of dy and satisfaction of LW constraint. In case there is a violation, amount of correction applied is adjusted so as to satisfy these two constraints. Repeat the two steps 1045 and 1050 for all dissimilar points (1055). At the end of this process, the fine scale image is corrected for possible errors based on the reference coarse scale image (1060). The total correction applied on T image is computed (1065). If this correction is outside a threshold limit (1070), then it is assumed that the noise contained in the multiple multi-scale images is too high to perform any useful analysis and hence, RCWS is switched to silent mode (1075).

FIG. 11 illustrates the construction of the mosaic using @DF information. The distance traveled by the vehicle (@DF) during the time between two consecutive sets of image acquisitions is computed (1100). Mosaic is constructed using a series of @DFs from bottom to top (1105). The computed @DF consists of two components: left lane marker and right lane marker (1110). End points of left and right lane markers are assumed to be current anchor points of left and right lane markers in mosaic (1115). That is, the identified @DF segment is naturally used to extend the mosaic. Extend the mosaic by appending the left lane marker of @DF on left lane marker of mosaic and the right lane marker of @DF on right lane marker of the mosaic (1120). Let three consecutive left lane mosaic segments be @DF, @DF0 and @DF-1 (1125). Based on the context of @DF and @DF-1, error at @DF0 is computed and the @DF0 segment is corrected to minimize the error (1130). Compute approximate rate of change (dy): dy0=(y2−y1)/(x2−x1) for @DF0 segment and dy1=(y3−y0)/(x3−x0) for the segment obtained from the concatenation of the segments @DF-1, @DF0 and @DF (1135). If |dy1−dy0| is less than the threshold, OT (1140), then no correction is done for the @DF0 and the above steps are repeated for right lane marker (1145). Else, check for error with respect to the segment @DF-1 (1150). If the error with respect to @DF-1 is within tolerance, y2 value is readjusted to minimize error with respect to @DF0 (1155). The correction for y2 is calculated by adjusting dy0 to be as close as possible to dy1. Otherwise (1150), let error associated with @DF-1 be e0 and error associated with @DF0 be e1 (1160). The values y1 and y2 are readjusted such that e0 and e2 are minimized (1165). Compute cumulative residual error of the entire mosaic of M segments (1170). If this error is less than the threshold, TME (1175), the steps 1125 through 1180 are repeated for the right lane marker (1145). Else, WS is set OFF (1180) and hence, RCWS is switched to silent mode. Note that WS is set ON again when the conditions for RCWS are favorable such as good road visibility so as to be able to generate warning about over-speed. Further, when WS is set ON again, the mosaic construction starts from scratch.

FIG. 12 describes the curvature identification and safety warning procedure. The best matching curvature template is identified for a portion of the mosaic using the templates in the database (1200). The curvature templates with the associated rules are based on highway road construction standards and are obtained by interacting with highway road design experts. Each curvature type is identified as made up of one or more curvature components and each such curvature component is described using a set of rules (1205). Mosaic is extended segment at a time and if a partial mosaic, yet to be labeled, satisfies all the rules of a curvature component, then that portion of the mosaic is sub-labeled with the corresponding curvature component label and based on the series of curvature components, template labeling is done for the mosaic covered by the set of curvature components (1210). On addition of @DF to mosaic, determine the partial mosaic as from @DF to the last segment yet to be labeled (1215). Compute partial mosaic parameters such as its length, radius, and rate of change dy (1220). Use computed parameters to validate as many rules of as many curvature components (1225). A check is performed to determine whether any curvature component is successfully labeled (1230). That is, all the rules associated with that curvature component are satisfied by the computed parameters of the partial mosaic. If no curvature component is labeled, and the length of partial mosaic exceeds a component length threshold, then WS flag is set OFF (1235). If any curvature component is labeled (1230), then a check is performed to determine whether all the components of a curvature type are successfully labeled (1240). If not (1240), yet another check is made to determine whether the labeled components are adequate to unambiguously anticipate the oncoming road curvature (1245). If all the components of a curvature type are successfully labeled (1240), or a curvature type can be anticipated based on the labeled components (1245), then the limit speed is computed based on the curvature type using the computed parameters and the standard formulae (1250). An over-speed warning is generated if the current ground speed exceeds the computed limit speed. If any curvature component is labeled and the labeled components are not sufficient to identify a curvature type (1245), then the limit speed is computed based on the identified curvature component using computed parameters and a set of rules, and warning is generated if the current ground speed exceeds the computed limit speed (1255).

FIG. 13 illustrates the typical databases and the tables used in the RCWS system. System configuration database (1300) consists of configurable parameters (1305) and configurable camera parameters (1310). System configuration primarily consists of camera configurations including extrinsic and intrinsic parameters and the system parameters to be configured such as standard lane width, lane marker width, and lane gaps. Lane templates database (1315) has information related to the curvature types (1320) and the rules associated with the curvature components that define curvature templates (1325).

FIG. 14 lists the issues that are relevant to a system such as RCWS and describes how several of such issues are addressed in RCWS.

Thus, a system and method for generating an over-speed warning based on road curvature identification and analysis has been disclosed. Although the present invention has been described particularly with reference to the figures, it will be apparent to one of the ordinary skill in the art that the present invention may appear in any number of systems that perform warning generation based on road curvature. It is further contemplated that many changes and modifications may be made by one of ordinary skill in the art without departing from the spirit and scope of the present invention.

Acronyms and Definitions

| | | |
|---|---|---|
| 1. | BI | Binarized Image |
| 2. | BT | Binarization threshold |
| 3. | CC | Camera Controller |
| 4. | $C_{LMW}$ | Current Lane marker width |
| 5. | CLT | Component Length Threshold |
| 6. | $C_{LW}$ | Current Lane width |
| 7. | DF | Decision Frame |
| 8. | DY | Rate of change of a lane chain (used in both upper and lower case forms) |
| 9. | FPS | Frames Per Second |
| 10. | IPM | Inverse perspective mapping |
| 11. | LA/LAD | Look ahead/Look ahead distance |
| 12. | LLC | Left lane chain |
| 13. | LLT | Lane luminescence threshold |
| 14. | LMLT | Lane marker luminescence threshold |
| 15. | LMW | Lane marker width |
| 16. | LVT | Lane visibility threshold |
| 17. | LW | Lane width |
| 18. | MF | Meta-decision frame |
| 19. | MSP | Multi-scale processing |
| 20. | OI | Original Image |
| 21. | OT | Orientation threshold |
| 22. | PI | Preprocessed Image |
| 23. | PV | Poor Visibility |
| 24. | PVT | Poor Visibility threshold |
| 25. | RBI | Rectified binarized Image |
| 26. | RCWS | Road Curvature Warning System |
| 27. | RF | Road frame |
| 28. | RLC | Right lane chain |
| 29. | ROI | Rectified Original Image |
| 30. | RVT | Road Visibility Threshold |
| 31. | SLAD | Speed-to-Look ahead distance |
| 32. | SLMW | Standard lane marker width |
| 33. | SLW | Standard lane width |
| 34. | TI | Thinned Image |
| 35. | $T_{LMW}$ | Threshold on Lane width |
| 36. | $T_{LW}$ | Threshold on Lane width |
| 37. | TME | Threshold on Mosaic error |
| 38. | V-CORR | Vertical lane chain correlation threshold |
| 39. | WS | Warning Signal |

What is claimed is:

1. A road curvature warning system based on the analysis of multiple multi-scale images for efficiently identifying road curvature while driving at high speed on a highway, said road curvature warning system comprising:

(a) an RCWS controller subsystem for controlling cameras and interfacing with a vehicle, said RCWS controller subsystem comprising:

a system configuration element for dynamically managing system configuration related to camera, system thresholds, and standard road dimensions;

a camera controller element for dynamically controlling the cameras;

a vehicle interface element for obtaining vehicle related parameters comprising ground speed and slope; and a multi-camera element for acquiring multiple multi-scale images; and (b) an RCWS preprocessor subsystem for preprocessing an image, said RCWS preprocessor subsystem comprising:
an error correction and binarization element for image preprocessing, correcting said image for heading and offset errors, and binarization of said image;
a road parameter computation element for computing the lane width and lane marker width;
a look-ahead distance computation element for determining an appropriate look-ahead distance for configuring the cameras; and
a visibility checking element for determining the road visibility conditions; and (c) an RCWS processor subsystem for generating curvature related over-speed warnings based on a plurality of multi-scale images, said RCWS processor subsystem comprising:
a lane identification element for identifying left and right road lane markers in said plurality of multi-scale images;
a multi-scale image processing element for analyzing said plurality of multi-scale images to correlate and correct a plurality left and right lane markers across said plurality of multi-scale images;
a mosaic construction element for constructing a road mosaic using said plurality of left and right lane markers;
a road curvature identification element for identifying a road curvature from said road mosaic; and
a warning generation element for generating an appropriate warning to the driver based on said road curvature.

2. The system of claim 1, wherein said camera controller element of said RCWS controller subsystem comprises means for dynamically configuring and controlling of cameras based on a look-ahead distance, wherein said look-ahead is computed based on vehicle speed and road visibility.

3. The system of claim 1, wherein said vehicle interface element of said RCWS controller subsystem comprises means for interfacing with vehicle control system to obtain vehicle related parameters consisting of vehicle speed and road vertical gradient, wherein said obtaining of said speed and said gradient are performed periodically.

4. The system of claim 1, wherein said multi-camera element of said RCWS controller subsystem comprises means for capturing the multiple multi-scale images of a road from multiple cameras, wherein said cameras are with the same focal point and cover different lengths of said road.

5. The system of claim 1, wherein said error correction and binarization element of said RCWS preprocessor subsystem comprises means for image preprocessing of a road image, said image preprocessing comprises:
performing inverse perspective mapping operation on said road image to determine a perspective free road image;
performing error correction operation by identifying and correcting heading and offset errors in said perspective free road image to determine a corrected road image;
performing resealing operation on said corrected road image to determine a resealed road image; and
performing binarization operation on said resealed road image based on edge detection operation.

6. The system of claim 1, wherein said road parameter computation element of said RCWS preprocessor subsystem comprises means for computing lane width and lane marker width periodically, wherein said means for computing comprises:
derivation of a count matrix from a binarized image of a road image, wherein rows and columns of said count matrix contains counts of consecutive 0's and 1's in rows and columns of said binarized image;
determination of a plurality of clusters of each column of said count matrix;
selection of a plurality of clusters from said plurality of clusters based on standard lane widths and lane marker widths; and
adjusting said binarized image and said road image based on said selected plurality of clusters.

7. The system of claim 6, wherein said road parameter computation element further comprises means for characterizing lane and lane marker segments of a road image in terms of pixel values, wherein said characterization of lane segment comprises:
determining pixels of said lane segment of said road image;
determining plurality of clusters of said pixels;
selecting a cluster of maximum density from said plurality of clusters; and
computing centroid of said selected cluster, and
said characterization of lane marker segment comprises:
determining pixels of said lane marker segment of said road image;
determining plurality of clusters of said pixels;
selecting a cluster of maximum density from said plurality of clusters; and
computing centroid of said selected cluster.

8. The system of claim 1, wherein said look-ahead distance computation element of said RCWS preprocessor subsystem comprises means for computing look ahead distance and reconfiguring a plurality of cameras, wherein said means for computing and reconfiguring comprises:
obtaining a vehicle speed;
obtaining a look ahead distance from a lookup table based on said vehicle speed;
checking for road visibility conditions at said look ahead distance; and
adjusting parameters of said plurality of cameras based on said vehicle speed and said visibility conditions.

9. The system of claim 1, wherein said visibility checking element of said RCWS preprocessor subsystem comprises means for checking visibility of lane markers in a road image, wherein said checking comprises:
obtaining a characterization of a plurality of lane markers in said road image;
obtaining a characterization of a lane of said road image based on said plurality of lane markers;
categorizing pixels of said road image based on said characterization of lane markers and said characterization of lane;
computing percentage of lane marker information and non-road information in said road image; and
ensuring sustained goodness or badness of visibility conditions.

10. The system of claim 1, wherein said lane identification element of said RCWS processor subsystem comprises means for identifying and labeling of a plurality of bounded lane chains in a binarized image, wherein said identification of each of said plurality of bounded lane chains is based on horizontal and vertical neighborhood connectivity within tolerance, and said labeling is based on position of each of said bounded chains with respect to the image center of said binarized image.

11. The system of claim 10, wherein said lane identification element further comprises means for determining a plurality of merged paired lane chains from a plurality of bounded left lane chains and right lane chains, wherein said means for determining a plurality of merged paired lane chains comprises:
- identifying a subset of said plurality of bounded left lane chains;
- identifying a subset of said plurality of right lane chains such that said subset of bounded left lane chains and said subset of bounded right lane chains satisfy a plurality of constraints consisting of lane width constraint and closeness of anchor points constraint;
- merging a plurality of left lane chains of said subset of left lane chains, wherein said merging is based on identification of one bounding rectangle the bounded rectangles of said subset of left lane chains; and
- merging a plurality of right lane chains of said subset of right lane chains, wherein said merging a plurality of right lane chains is based on identification of one bounding rectangle covering the bounded rectangle of each of said subset of right lane chains.

12. The system of claim 10, wherein said lane identification element further comprises means for identifying and merging a plurality of bounded lane chains, wherein said identification and merging comprises:
- identifying a subset of said plurality of bounded lane chains such that a plurality of bounded lane chains in said subset satisfy a plurality of constraints consisting of: similarity in rate of change and orientation constraint; lane marker gap constraint; and contiguity constraint;
- selecting a plurality of bounded lane chains from said subset such that each of said selected plurality of bounded lane chains correlate with a bounded lane chain in said selected plurality of bounded lane chains; and
- merging a plurality of bounded lane chains of said selected plurality of lane chains, wherein said merging is based on identification of one bounding rectangle covering the bounded rectangle of each of said selected plurality of lane chains.

13. The system of claim 10, wherein said lane identification element further comprises means for forming a left lane marker and a right lane marker of a road image, wherein said left lane marker formation from a plurality of thinned left lane chains comprises:
- identifying a left minimal subset of said plurality of thinned left lane chains optimally with least upper gap with respect to the upper edge of said road image, least lower gap with respect to the lower edge of said road image, and exhibiting similarity in rate of change and orientation, and said right lane marker formation from a plurality of thinned right lane chains comprises:
- identifying a right minimal subset of said plurality of thinned right lane chains optimally with least upper gap with respect to the upper edge of said road image, least lower gap with respect to the lower edge of said road image, and exhibiting similarity in rate of change and orientation.

14. The system of claim 13, wherein said means for forming a left lane marker and a right lane marker further comprises:
- selecting a left maximal subset of said left minimal subset;
- selecting a right maximal subset of said right minimal subset;
- ensuring that a plurality of lane chains in said left maximal subset and a plurality of lane chains in said right maximal subset optimally satisfy lane width constraint;
- merging lane chains in said left maximal subset without violating rate of change and orientation constraint; and
- merging lane chains in said right maximal subset without violating rate of change and orientation constraint.

15. The system of claim 1, wherein said multi-scale image processing element of said RCWS processor subsystem comprises means for multi-scale analysis for correcting a fine scale image of a road, wherein said multi-scale analysis comprises:
- analyzing a coarse scale image of said road to determine a coarse left lane marker and a coarse right lane marker;
- analyzing a medium scale image of said road to determine a medium left lane marker and a medium right lane marker;
- analyzing a smooth scale image of said road to determine a smooth left lane marker and a smooth right lane marker;
- analyzing said fine scale image of said road to determine a fine left lane marker and a fine right lane marker;
- correlating said medium left lane marker of said medium scale image with said coarse left lane marker of said coarse scale image to determine a corrected medium left lane marker;
- correlating said medium right lane marker of said medium scale image with said coarse right lane marker of said coarse scale image to determine a corrected medium right lane marker;
- correlating said smooth left lane marker of said smooth scale image with said corrected medium left lane marker to determine a corrected smooth left lane marker;
- correlating said smooth right lane marker of said smooth scale image with said corrected medium right lane marker to determine a corrected smooth right lane marker;
- correlating said fine left lane marker of said fine scale image with said corrected smooth left lane marker to determine a corrected fine left lane marker; and
- correlating said fine right lane marker of said fine scale image with said corrected smooth right lane marker to determine a corrected fine right lane marker.

16. The system of claim 15, wherein said multi-scale analysis further comprises means for correlating a medium scale image with a low scale image and correcting said medium scale image, wherein said correlation and correction comprises:
- extracting a portion around image center of said low scale image;
- scaling said portion to match the size of said medium scale image;
- determining a low left bounded rectangle around a left lane marker of said portion;
- determining a low right bounded rectangle around a right lane marker of said portion;
- determining a medium left bounded rectangle around a left lane marker of said medium scale image;
- determining a medium right bounded rectangle around a right lane marker of said medium scale image;

computing a left similarity measure between said low left bounded rectangle and said medium left bounded rectangle to determine a left set of points of dissimilarity;

computing a right similarity measure between said low right bounded rectangle and said medium right bounded rectangle to determine a right set of points of dissimilarity;

applying an adjustment on said medium scale image based on said left set of points of dissimilarity and said right set of points of dissimilarity satisfying a plurality of constraints consisting of: rate of change and orientation constraint; and lane width constraint; and computing the total of said adjustment on said medium scale image.

17. The system of claim 1, wherein said mosaic construction element of said RCWS processor subsystem comprises means for extending a mosaic with a left lane marker and a right lane marker, wherein said extension comprises:

appending said left lane marker and said right lane marker to said mosaic;

analyzing a plurality of consecutive left lane segments consisting of top, middle and bottom segments to determine a left segment error in said appending of said left lane marker to said mosaic;

analyzing a plurality of consecutive right lane segments consisting of top, middle and bottom segments to determine a right segment error in said appending of said right lane marker to said mosaic;

adjusting the end points of said middle segment of said plurality of consecutive left lane segments of said mosaic and the end points of said middle segment of said plurality of consecutive right lane segments of said mosaic to minimize said left segment error and said right segment error; and computing the cumulative residual error of said mosaic.

18. The system of claim 1, wherein said road curvature identification element of said RCWS processor subsystem comprises means for template matching a mosaic with a plurality of curvature type templates, wherein said template matching is based on component matching of a plurality of curvature components of each of said plurality of curvature type templates and selecting a curvature type based on unambiguous matching of said plurality of curvature components of said curvature type, wherein said component matching is based on successful satisfaction of a set of rules associated with each of said plurality of curvature components based on said mosaic.

19. The system of claim 1, wherein said warning generation element of said RCWS processor subsystem comprises means for generating a warning to the driver driving a vehicle on a road based on comparing computed speed with actual speed of said vehicle, wherein said computation of speed is based on a curvature type of curvature of said road and a set of rules associated with said curvature type.

20. An apparatus for analysis of multiple multi-scale images for efficiently identifying road curvature while driving a vehicle at high speed on a highway, said apparatus comprising:

(a) a hardware and software RCWS controller subsystem for controlling a plurality of cameras and interfacing with said vehicle comprising:
 a processor of appropriate capacity;
 memory devices of appropriate capacity;
 an interface subsystem for interacting with ground speed sensor and slope detector of said vehicle, and
 a system configuration repository; software subsystem for configuring and controlling said plurality of cameras, and for acquiring multiple multi-scale images from said plurality of cameras; and (b) a hardware and software RCWS preprocessor subsystem for preprocessing an image of a road comprising:
 a processor of appropriate capacity;
 memory devices of appropriate capacity;
 a software subsystem for image preprocessing, heading error and offset error correction, and binarization of said image of said road;
 a software subsystem for computing a lane width and a lane marker width in said image;
 a software subsystem for determining an appropriate look-ahead distance for configuring said plurality of cameras; and
 a software subsystem for determining visibility conditions of said road; and (c) a hardware and software RCWS processor subsystem to analyze a plurality of multi-scale images of a road comprising:
 a processor of appropriate capacity;
 memory devices of appropriate capacity; a repository of lane templates;
 a software subsystem for identifying a left lane marker and a right lane marker in each of said plurality of multi-scale images;
 a software subsystem for analyzing said plurality of multi-scale images to correlate said left lane marker and said right lane marker in each of said plurality of multi-scale images across said plurality of multi-scale images, and to determine a road left lane marker and a road right lane marker;
 a software subsystem for constructing a road mosaic using said road left lane marker and said road right lane marker;
 a software subsystem for identifying a road curvature from said road mosaic; and
 a software subsystem for generating an appropriate warning to the driver of said vehicle based on said road curvature.

* * * * *